(12) United States Patent
Prelot et al.

(10) Patent No.: US 10,799,850 B2
(45) Date of Patent: Oct. 13, 2020

(54) ORGANOSILICON MATERIAL FOR THE DECONTAMINATION OF WATER

(71) Applicants: CENTRE NATIONAL DE LA RECHERCHE SCIENTIFIQUE, Paris (FR); UNIVERSITE DE MONTPELLIER, Montpellier (FR); AXLR, SATT DU LANGUEDOC ROUSSILLON (SATT AXLR), Montpellier (FR)

(72) Inventors: Bénédicte Prelot, Pouzols (FR); Peter Hesemann, Juvignac (FR); Ut Dong Thach, Montpellier (FR); Jerzy Zajac, Prades le Lez (FR)

(73) Assignees: CENTRE NATIONAL DE LA RECHERCHE SCIENTIFIQUE, Paris (FR); UNIVERSITE DE MONTPELLIER, Montpellier (FR); AXLR, SATT DU LANGUEDOC ROUSSILON (SATT AXLR), Montpellier (FR)

( * ) Notice: Subject to any disclaimer, the term of this patent is extended or adjusted under 35 U.S.C. 154(b) by 230 days.

(21) Appl. No.: 15/747,708

(22) PCT Filed: Jul. 26, 2016

(86) PCT No.: PCT/EP2016/067790
§ 371 (c)(1),
(2) Date: Jan. 25, 2018

(87) PCT Pub. No.: WO2017/017097
PCT Pub. Date: Feb. 2, 2017

(65) Prior Publication Data
US 2018/0207612 A1 Jul. 26, 2018

(30) Foreign Application Priority Data
Jul. 28, 2015 (FR) ...................................... 15 57192

(51) Int. Cl.
*B01J 20/10* (2006.01)
*B01J 20/28* (2006.01)
(Continued)

(52) U.S. Cl.
CPC .......... *B01J 20/262* (2013.01); *B01J 20/103* (2013.01); *B01J 20/2808* (2013.01);
(Continued)

(58) Field of Classification Search
None
See application file for complete search history.

(56) References Cited

U.S. PATENT DOCUMENTS 8,252,337 B2 8/2012 Lee et al.
2014/0144841 A1* 5/2014 Boileau ................... B01J 41/12
210/679

OTHER PUBLICATIONS

Ghaedi, M. et al—"Ionic liquid based periodic mesoporous organosilica: An efficient support for removal of sunset yellow from aqueous solutions under ultrasonic conditions"—Journal of Industrial and Engineering Chemistry 20, 2014 (Year: 2014).*
(Continued)

*Primary Examiner* — Bradley R Spies
(74) *Attorney, Agent, or Firm* — The Marbury Law Group, PLLC

(57) ABSTRACT

The subject of the present invention is the use of a porous or non-porous organosilicon material for eliminating radionuclides, mineral anions, anionic molecular entities and negatively charged dyes or active principles from an aqueous solution, characterized in that the structure of said organosilicon material is formed of repeat units, each repeat unit comprising at least one positively charged entity selected from an ammonium entity, an imidazolium entity, a guanidinium entity, a pyridinium entity and a phosphonium entity and being incorporated into a silicon network by at least two silicon-carbon bonds. The invention also relates to a specific
(Continued)

novel organosilicon material, comprising at least one benzyl group, one 4-phenylbenzyl group or one styrene group in each repeat unit.

26 Claims, 8 Drawing Sheets

(51) Int. Cl.
      *B01J 41/04*     (2017.01)
      *C02F 1/00*     (2006.01)
      *C02F 1/28*     (2006.01)
      *C02F 101/00*     (2006.01)
      *C02F 101/10*     (2006.01)
      *C02F 101/30*     (2006.01)
      *B01J 20/26*     (2006.01)
      *B01J 41/13*     (2017.01)
      *C08G 77/26*     (2006.01)
      *C08G 77/452*     (2006.01)
      *C02F 101/22*     (2006.01)
      *C02F 101/34*     (2006.01)
      *C02F 101/38*     (2006.01)

(52) U.S. Cl.
    CPC ... *B01J 20/28016* (2013.01); *B01J 20/28042* (2013.01); *B01J 20/28057* (2013.01); *B01J 20/28069* (2013.01); *B01J 20/28083* (2013.01); *B01J 41/04* (2013.01); *B01J 41/13* (2017.01); *C02F 1/004* (2013.01); *C02F 1/285* (2013.01); *C08G 77/26* (2013.01); *C08G 77/452* (2013.01); *C02F 2101/006* (2013.01); *C02F 2101/10* (2013.01); *C02F 2101/22* (2013.01); *C02F 2101/308* (2013.01); *C02F 2101/34* (2013.01); *C02F 2101/38* (2013.01)

(56) References Cited

OTHER PUBLICATIONS

Walcarius, et al., "Mesoporuous organosilica adsorbents: nanoengineered materials for removal of organic and inorganic pollutants", Journal of Materials Chemistry, vol. 20, No. 22, pp. 4478-4510, XP055083054, (Jan. 1, 2010).

Hesemann, et al., "Precursor Mediated Synthesis of Nanostructured Silicas: From Precursor-Surfactant Ion Pairs to Structured Materials", Materials, vol. 7, No. 4, pp. 2978-3001, XP055283706, (Apr. 11, 2014).

Nguyen, et al., "Nanostructured polysilsesquioxanes bearing amine and ammonium groups by micelle templating using anionic surfactants", Journal of Materials Chemistry, vol. 20, No. 19, pp. 3910-3917, XP055283671, (Jan. 1, 2010).

Nguyen, et al., "i-Silica: Nanostructured silica hybrid materials containing imidazolium groups by hydrolysis-polycondensation of disilylated bis-N,N'-alkyl-imidazolium halides", Microporous and Mesoporous Materials, Elsevier Science Publishing, vol. 142, No. 1, pp. 292-300, XP028163819, (Dec. 10, 2010).

Lee, et al., "Synthesis and Characterization of Periodic Mesoporous Organosilicas as Anion Exchange Resins for Perrhenate Adsorption", Langmuir, vol. 21, No. 12, pp. 5372-5376, (Jun. 1, 2005).

International Search Report from the European Patent Office in International Application No. PCT/EP2016/067790 dated Oct. 20, 2016.

Hankari, et al., "Pore size control and organocatalytic properties of nanostructured silica hybrid materials containing amino and ammonium groups", J. Mater. Chem., 21, pp. 6948-6955, (2011).

Rouquerol et al.,"Texture des matériaux pulvérulents ou poreux" [Texture of pulverulent or porous materials] of the Techniques de l'Ingénieur handbook by F. Rouquerol et al., p. 1050-1/p. 1050-24 (Texture des matériaux pulvérulents ou poreux, Techniques de l'Ingénieur, (Mar. 10, 2003).

P. Wasserscheid and T. Welton (Eds.), Ionic Liquids in Synthesis, Wiley-VCH Verlag GmbH & Co. KGaA, Weinheim, pp. 9-12, (2002).

Barrett, et al., "The Determination of Pore Volume and Area Distributions in Porous Substances. I. Computations from Nitrogen Isotherms", Journal of the American Chemical Society, 73, pp. 373-380, (1951).

Bennett, et al., "Structural Investigations of AMS-n Mesoporous Materials by Transmission Electron Microscopy", Chemistry of Materials, 16, pp. 813-821, (2004).

Meziani, et al., "Surface Characterization of Mesoporous Silicoaluminates of the MCM-41 Type: Evaluation of Polar Surface Sites Using Flow Calorimetry, Adsorption of a Cationic Surfactant as a Function of Pore Size and Aluminum Content", Langmuir, 13, pp. 5409-5417, (1997).

Szczodrowski, et al., "Effect of heteroatom doping on the surface acidity and hydrophilicity of Al, Ti, Zr-doped mesoporous SBA-15", Microporous and Mesoporous Materials, 124 (1-3), pp. 84-93, (2009).

* cited by examiner

ORGANOSILICON MATERIAL FOR THE DECONTAMINATION OF WATER

CROSS REFERENCE TO RELATED APPLICATIONS

This is a national stage application of PCT/EP2016/067790, filed internationally on Jul. 26, 2016, which claims priority to French Application No. 1557192, filed on Jul. 28, 2015, both of which are incorporated by reference herein in their entireties.

The present invention relates the field of the decontamination of water and in particular of the sorption of radionuclides or of anionic entities, such as mineral anions, anionic molecular entities and negatively charged dyes or active principles.

Thus, the present invention is advantageous in the treatment of water, in particular the treatment of industrial effluents or effluents resulting from nuclear applications with the aim of removing contaminating anionic entities and also radionuclides.

PRIOR STATE OF THE ART

The problems of chemical contamination of water have become a significant source of anxiety and a priority challenge for any industrial sector. Apart from the pretreatment or primary treatment, two types of processes are listed among secondary treatment, or purification, processes: biodegradation and physicochemical methods. In the latter cases, mention is made of physical or membrane filtration methods, conventional or advanced oxidation processes and in particular adsorption techniques.

Ion-exchange resins are conventionally used to decontaminate water, in particular for the purpose of removing ionic entities and more particularly anionic entities.

This is because, in view of the diversity of the potentially dangerous contaminating entities (dyes, chromium, arsenic, cyanide, fluorides, fluoroborates, medicinal active principles, endocrine disruptors, some pesticides, and the like) or products which are less dangerous but which are emitted in very large amounts (nitrates, sulfates, phosphates, and the like), it is a determining factor to be able to access anion exchangers.

Therefore, to date, resins of poly(styrene)/poly(divinylbenzene) type, in particular resins of Amberlite (IRA96 and IRA67 or also IRN 78) types sold by Rohm and Haas, are employed in particular. Resins of this type are valued as a result of their reversibility, thus opening the possibility of recycling both the adsorbent material and the adsorbate.

It proves to be that a person skilled in the art is continually looking for materials having enhanced adsorption capacities for anionic entities in comparison with these conventional materials.

Furthermore, there exists a need to have available materials, the chemical stability of which is improved in comparison with the ion-exchange resins normally used.

The improvement in terms of selectivity with regard to a given anionic entity or in terms of anion-exchange kinetics is also a matter of ongoing concern.

Furthermore, it is known to use certain mesoporous silicas, the diameter of the pores of which extends from 2 to 50 nm (according to the IUPAC classification), in various applications, including the retention of ionic entities.

In particular, some mesoporous silicas have been functionalized in the past to this end, in particular for the purpose of modulating their physicochemical properties and more particularly their associated adsorbent capacities.

In other words, attempts have already been made to find solutions for introducing an organic component into these inorganic substrates, for the purpose of combining the potential of organic functional variations of organic chemistry with the advantages of the stability and the robustness of silica-based inorganic substrates.

The three functionalization routes which have been the most widely described in the literature are:
  (i) postsynthesis grafting; in other words, the mesoporous material is modified at the surface of the pores after it has been synthesized,
  (ii) cocondensation; in other words, the silica and organosilicon precursors corresponding to the desired modification are condensed simultaneously, and
  (iii) production of periodic organosilicon mesoporous materials by employing bissilylated organosilanes ("bridging organosilica precursor") as sole source of materials.

All of these hybrid silicas have been described as PMOs in the literature: "Periodic Mesoporous Organosilica". Among these PMOs, those exhibiting ionic groups have been called "i-silica" or "ionosilica".

Mention may in particular be made of the patent U.S. Pat. No. 8,252,337, which discloses mesoporous silica comprising functional groups of quaternary ammonium type of use in the controlled release of active substances.

The application of certain mesoporous silicas in the treatment of water has been described in the literature, in particular for purposes of decontamination by removal of oxyanions (Walcarius et al., "Mesoporous organosilica adsorbents: nanoengineered materials for removal of organic and inorganic pollutants", J. Mater. Chem., 2010, 20, 4478-4511).

However, the functionalization, as reported in the two 'cocondensation and postgrafting' alternatives described above, is introduced only at the surface of the material. In point of fact, with regard to these functionalized materials carrying surface groups, the density of the surface groups and the homogeneity in their distribution and also their accessibility are again adjustable with difficulty. In addition, the hydrothermal stability is not optimum and the leaching during desorption/regeneration cycles is a frequently observed disadvantage.

Furthermore, there is known, from S. El Hankari et al., "Pore size control and organocatalytic properties of nanostructured silica hybrid materials containing amino and ammonium groups", J. Mater. Chem., 2011, 21, 6948-6955, a novel material in comparison with all of the materials of the prior art discussed above, which is characterized by a very specific structure of mixed mineral/organic nature, comprising, in each repeat unit forming the material, at least one ammonium, imidazolium or guanidinium entity covalently bonded to the surrounding silicon network. On the other hand, the applications described in this paper concern exclusively organocatalytic performance qualities. The paper is entirely silent with regard to any other technical application of the material There is also known, from B. Lee et al., "Synthesis and Characterization of Periodic Mesoporous Organosilicas as Anion Exchange Resins for Perrhenate Adsorption", Langmuir, 2005, 21, 5372-5376, a material synthesized from an N-(3-triethoxysilylpropyl)-N'-(3-trimethoxysilylpropyl)-4,5-dihydroimidazolium iodide precursor as exchange resin for perrhenate anions. However, the adsorption capacity reported is very low, 1.85 mg of Re/g (equivalent to 10 µmol/g), so that only the removal of this specific anion in the trace form is described.

Recently, the inventors have found that organosilicon materials of mixed mineral/organic nature prepared from precursors comprising at least one positively charged entity chosen from an ammonium, imidazolium, guanidinium, pyridinium or phosphonium entity prove to be effective in removing anionic entities or radionuclides in an aqueous medium, in particular at adsorption capacities of greater than 0.5 mmol/g.

In particular, their very hydrophilic nature allows them to be used within aqueous solutions or effluents.

It is specifically an object of the present invention to provide for the use of a porous or nonporous organosilicon material of ionosilica type, formed of repeat blocks or units, each repeat unit comprising at least one positively charged entity chosen from an ammonium, imidazolium, guanidinium, pyridinium or phosphonium entity and being incorporated in a silicon network by at least two silicon-carbon bonds, making it possible to effectively meet all of the requirements evoqued above.

SUMMARY OF THE INVENTION

A subject matter of the invention is the use of an organosilicon material for removing, from an aqueous solution, radionuclides, mineral anions, anionic molecular entities and negatively charged dyes or active principles, characterized in that the structure of said organosilicon material is formed of repeat units, each repeat unit comprising at least one positively charged entity chosen from an ammonium, imidazolium, guanidinium, pyridinium or phosphonium entity and being incorporated in a silicon network by at least two silicon-carbon bonds.

The use of such a material exhibits first the advantage of being reversible and of thus making possible recycling of the material. Furthermore, high retention capacities could be observed. Rapid exchange kinetics are also an advantage of the material in accordance with the present invention. Finally, the simplicity as regards synthesis is another major advantage of the present invention.

FIGURES

FIG. 1: $N_2$ adsorption-desorption isotherm at 77K of the material prepared in example 1. (black dots, adsorption branch, gray dots, desorption branch)

FIG. 2: $N_2$ adsorption-desorption isotherms at 77K of the 9 materials prepared in example 2.

FIG. 3: X-ray diffraction of the ionosilicas 1, 4 and 7 prepared in example 2.

FIG. 4: SEM and TEM images of the ionosilica materials 1 and 2 prepared in example 2.

FIG. 5: Sorption/retention isotherm for chromate anions of the ionosilica material 1 as prepared in example 2 and comparison of retention capacity with a conventional anion-exchange resin.

FIG. 6: Sorption/retention kinetics for chromate anions on the three ionosilicas 1, 4 and 7 as prepared in example 2.

FIG. 7: Curve representing the adsorption capacity with regard to para-aminosalicylate of the ionosilica materials 1 and 2 prepared in example 2.

FIG. 8: Adsorption capacities with regard to methyl orange of the ionosilica materials 1 and 2 prepared in example 2.

FIG. 9: Diagrammatic representation of an unstructured organosilicon material.

FIG. 10: Diagrammatic representation of a nanostructured mesoporous ionosilica material.

FIG. 11: Diagrammatic illustration of the surface of functionalized ionosilicas (left) and of hybrid ionosilicas (right).

FIG. 12: $N_2$ adsorption-desorption isotherms at 77K of the materials SHS/BzTrisN, SHS/StyTrisN and SHS/BiPhTrisN prepared in example 5.

FIG. 13: SEM and TEM images of the materials SHS/BzTrisN and SHS/StyTrisN prepared in example 5.

FIG. 14: Photograph of the monolith as prepared in example 6 before and after extraction with supercritical $CO_2$.

FIG. 15: $N_2$ adsorption-desorption isotherms at 77K of the material prepared in example 6 with extraction by supercritical $CO_2$ (black dots, adsorption branch, gray dots, desorption branch).

FIG. 16: $N_2$ adsorption-desorption isotherm at 77K of the material prepared in example 6 with regard to pellets obtained by flash sintering (black dots, adsorption branch, gray dots, desorption branch).

ACCOUNT OF THE INVENTION

The organosilicon material in accordance with the invention and described in detail below has also been called "ionosilica".

"Ionosilicas" or "ionosilica material" is understood to mean, in the context of the present invention, silica-based solids which contain ionic substructures bonded to the silica network by covalent bonds.

"Hybrid" is understood to mean that the material which is referred to thereby comprises an inorganic component and an organic component.

"Silicon network" is understood to mean a three-dimensional network formed by Si—O—Si bonds and prepared by hydrolysis and condensation reactions starting from alkoxysilyl groups. In the case of tetraalkoxysilyl precursors, such as tetramethoxysilane TMOS or tetraethoxysilane TEOS, these reactions formally result in the formation of a network of the $SiO_2$ stoichiometry. In the case of hybrid silicas, the use of organic precursors carrying trialkoxysilyl groups makes possible the incorporation of organic groups within the silicon network by silicon-carbon bonds and consequently the formation of organosilicon materials.

Generally, an organosilicon material in accordance with the present invention may be characterized according to the methods described in the chapter "Texture des matériaux pulvérulents ou poreux" [Texture of pulverulent or porous materials] of the Techniques de l'Ingénieur handbook by F. Rouquerol et al., p 1050-1/p 1050-24 (Texture des matériaux pulvérulents ou poreux, Techniques de l'Ingénieur, 10 Mar. 2003).

Hybrid Ionosilica Material

The hybrid ionosilica material which may be used in the context of the present invention may be obtained by a hydrolysis/condensation process starting from at least one precursor and is formed of substructures or blocks also known as "repeat units".

Each repeat unit comprises at least one positively charged entity chosen from an ammonium, imidazolium, pyridinium, guanidinium or phosphonium entity and is incorporated in a silicon network by at least two silicon-carbon bonds.

In other words, the synthesis by hydrolysis/condensation, starting from at least one trisilylated cationic precursor comprising an ammonium, imidazolium, guanidinium, pyridinium or phosphonium entity comprising at least two hydrolyzable trialkoxysilyl groups, results in the formation of a material formed of positively charged ionic blocks which are incorporated in a silicon network by at least two silicon-carbon bonds.

Such a hybrid ionosilica material is represented diagrammatically in FIG. 9. It is found in particular that the positively charged entities are indeed distributed in the body of the material. Furthermore, FIG. 11 illustrates the major structural difference between surface-functionalized ionosilicas (left) and the hybrid ionosilicas in accordance with the present invention (right).

The ionosilica material in accordance with the present invention may be provided in the particulate form. Mention may in particular be made of powders, grains, beads or monoliths. The size of these particles may be between 50 nm and 5 cm, in particular between 200 nm and 2 mm, for example between 100 nm and 250 μm.

According to a specific embodiment of the invention, the ionosilica material is provided in the form of grains, beads or monoliths and more particularly still in the form of beads or monoliths.

In the context of the present invention, "monolith" is understood to mean a self-supported macroscopic object with a shape and size which may vary according to the synthesis conditions. The monoliths or the beads may be obtained by different routes.

According to a specific embodiment of the invention, the monoliths or the beads may be obtained by shaping with regard to the powders by virtue of sintering or flash sintering, also known as SPS. This preparation route is illustrated in example 6.

According to another specific embodiment of the invention, the monoliths or the beads may be obtained directly by the sol-gel route in a solvent-based phase, by synthesis in a multiphase medium (Stöber method or in an emulsion phase or by use of additives), or by solvent extraction in supercritical $CO_2$.

According to a particularly advantageous embodiment, the monoliths or the beads are obtained directly by the sol-gel route in a solvent-based phase by solvent extraction in supercritical $CO_2$. This preparation route is illustrated in example 6.

According to a specific embodiment of the invention, the material is provided in the powder form and may exhibit a size of between 50 nm and 50 μm, especially between 200 nm and 5 μm, in particular between 100 nm and 1 μm.

According to another specific embodiment of the invention, the material is provided in the form of monoliths and may exhibit a size of between 5 mm and 5 cm. By way of example, mention may in particular be made of monoliths exhibiting a size of between 5 mm and 2 cm, in particular between 10 mm and 2 cm.

The size of these particles may, for example, be measured by laser light scattering, by static or dynamic light scattering or by microscopy (optical, confocal, scanning electron or transmission electron) according to methods well known to a person skilled in the art.

This particulate form of the material results in a natural porosity of the material taken in its entirety. The empty space left between the grains of a powder (intergranular pores) depends on its packing and is not characteristic of the powder.

The extent of the surface of the organosilicon material, generally known as "area", is usually with reference to one gram of solid (specific surface or specific surface area or mass surface [$m^2 \cdot g^{-1}$]).

The porosity is defined, in the context of the present invention, as the ratio of the total pore volume V p,t (corresponding to the open porosity, to the closed porosity and to the intragranular porosity) to the total volume apparently occupied by the solid V p,t+V s (where V s is the volume which would be occupied by the material if it were dense, that is to say nonporous).

The pore volume and the specific surface may be measured by the vapor adsorption method:

Measurement of the Specific Surface and of the Porosity

After a degassing at appropriate temperature, a gas adsorption-desorption isotherm is produced by measuring and plotting the curve obtained by the measurement of the amount of gas adsorbed on the surface of a material of known weight or volume, as a function of the relative gas pressure ($P/P_0$) and for a given temperature, with P: equilibrium pressure of the gas and $P_0$: saturated vapor pressure of the gas. This measurement may, for example, be carried out on a device of ASAP2020 model sold by Micromeritics.

The volume at the monolayer is determined (point B method or BET model) from this curve.

The specific surface may then be calculated by taking into account the bulkiness of the probe molecule, for a given molecule and a given temperature (16.26 Å for $N_2$ at $-195.8°$ C., 14.40 Å for Kr at $-195.8°$ C.; 13.80 Å for Ar at $-195.8°$ C., 10.60 or 14.80 Å for $H_2O$ at 20° C., 18.5 Å for $CO_2$ at 20° C., 18.10 Å for $CH_4$ at $-140°$ C.). The pore volume may be calculated from the gas adsorption isotherm at saturation.

The material in accordance with the present invention may exhibit a specific surface, in particular calculated according to the method set out above, of between 10 and 2000 $m^2/g$, especially between 15 and 1600 $m^2/g$ and more particularly still between 20 and 1600 $m^2/g$.

According to a preferred embodiment, when the material is prepared with a structuring agent (template) and contains pores, the specific surface may advantageously be between 100 and 1600 $m^2/g$, in particular between 200 and 1300 $m^2/g$.

Synthesis

The materials which may be used in the context of the present invention may be synthesized by a "bottom-up" approach via hydrolysis/polycondensation reactions of at least one precursor comprising at least one functional group capable of being positively charged comprising at least one entity chosen from an amine, imidazole, pyridine, guanidine or phosphine entity and at least two hydrolyzable trialkoxysilyl groups.

The 'ionosilica' materials may be synthesized from a mixture of precursors.

The general synthesis process below is not intended to be limiting. The synthesis is based on the use of at least one precursor comprising at least one entity chosen from an ammonium entity, an imidazolium entity, a guanidinium entity, a pyridinium entity and a phosphonium entity and at least two hydrolyzable trialkoxysilyl groups.

The precursor(s) may be introduced with stirring into an aqueous solution which may subsequently be heated, under static conditions, to a temperature of between 50 and 95° C., especially between 60 and 90° C., in particular between 70 and 80° C., at a pH value which can be between 1 and 14, especially between 1 and 12.

The pH may be adjusted by a buffer or a strong acid or a strong base, for example chosen from buffers of the type of phosphates, carbonates, HEPES, TRIS, HCl, $CH_3COOH$, NaOH, KOH or $NH_4OH$.

The aqueous solution may in addition comprise an alcohol, in particular ethanol, methanol or isopropanol.

The product obtained after heating may be recovered by filtration and dried in the air, for example at a temperature ranging from 40 to 120° C., in particular from 60 to 100° C., for a period of time ranging from 6 to 72 hours, especially from 12 to 24 hours.

On conclusion of this stage, particles in the powder form are obtained.

It may also be advantageous to convert the powder thus obtained by one or more additional stages in order to obtain beads or monoliths in particular.

Mention may thus be made, as additional stage, of the direct shaping during the synthesis, the pelletizing and the sintering.

According to a preferred embodiment of the invention, an additional stage targeted at obtaining monoliths is favored. This embodiment exhibits the advantage of promoting the preservation of the properties desired for the material, such as expanded upon above, such as the adsorption capacity, the kinetic performance and the hydrophilicity.

Precursors

The precursors which may be used in the context of the present invention comprise at least one atom capable of being positively charged. This atom may be nitrogen or phosphorus.

More specifically, in the context of the present invention, the precursors are chosen from cationic silylated precursors comprising at least one ammonium, imidazolium, pyridinium, guanidinium or phosphonium entity and at least two hydrolyzable trialkoxysilyl groups.

In particular, the precursor may comprise two, three or four hydrolyzable trialkoxysilyl groups.

The synthesis of the precursors relies on the chemistry of ionic liquids, known to a person skilled in the art, and generally involves reactions of nucleophilic substitution type involving a base (amine, imidazole, pyridine, guanidine, phosphine) and an alkyl halide (in: P. Wasserscheid and T. Welton (Eds.), Ionic Liquids in Synthesis, Wiley-VCH Verlag GmbH & Co. KGaA, Weinheim, 2002, pages 9-12).

It is this positively charged entity which subsequently acts as exchanger in the finished material. In other words, it is at this exchanger group that the absorbate, in particular the contaminating molecule(s), will interact with the material when the material is brought into contact with an aqueous solution comprising the contaminating molecule(s).

Within the meaning of the present invention, the "hydrolyzable trialkoxysilyl groups" are groups of crosslinking silane type carrying three hydrolyzable radicals chosen from alkoxy groups, in particular from $(C_1-C_3)$alkoxy groups. These alkoxy groups may advantageously be chosen from methoxy, ethoxy and isopropoxy groups. For simplicity, the terms "trialkoxysilyl group" and "hydrolyzable trialkoxysilyl" will be used without distinction in the text.

In the description which follows:
the alkyl groups may be linear or branched and are preferably linear,
a halide may be chosen from an iodide, a chloride, a bromide or a fluoride.

According to a specific embodiment, a precursor may be represented by the following formula (I):

in which:

R1, R2, R3 and R4 represent, independently of one another, a hydrogen atom, a benzyl group, a 4-phenylbenzyl group, a styrene group or a $(C_1-C_{12})$alkyl group, for example a $(C_3-C_{11})$alkyl group, said alkyl group optionally being substituted by a trialkoxysilyl group as defined above, at least two of the R1, R2, R3 and R4 groups comprising a trialkoxysilyl group and at most one of the R1, R2, R3 and R4 groups being a benzyl group, a 4-phenylbenzyl group or a styrene group, $X^-$ represents a halide.

Mention may in particular be made, as example of such a precursor of formula (I), of the compound of following formula:

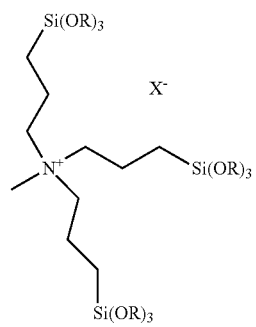

in which R represents a methyl, ethyl or propyl group and in particular the methyl group, it being possible for said compound also to be known as tris(3-(trialkoxysilyl)propyl) methylammonium halide.

Mention may very particularly be made of tris(3-(trimethoxysilyl)propyl)methylammonium (MeTrisN) halide and in particular the iodide.

Mention may also be made of the compounds of following formulae:

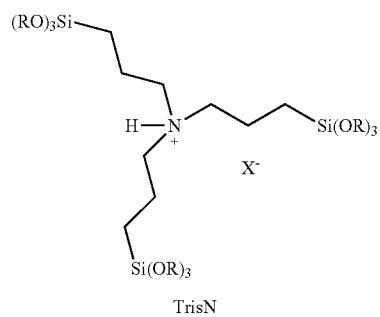

TrisN

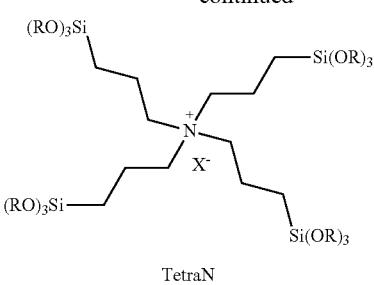

TetraN in which R represents a methyl, ethyl or propyl group and in particular the methyl group, it being possible for said compounds also to be called tris(3-(trialkoxysilyl)propyl) ammonium halide and in particular iodide and tetrakis(3-(trialkoxysilyl)propyl)ammonium halide and in particular iodide.

Mention is very particularly made of tris(3-(trimethoxysilyl)propyl)ammonium (HTrisN) halide and in particular the iodide and tetrakis(3-(trimethoxysilyl)propyl)ammonium (TetraN) halide and in particular the iodide.

Mention may also be made, as example of a precursor of formula (I), of the compounds of following formulae:

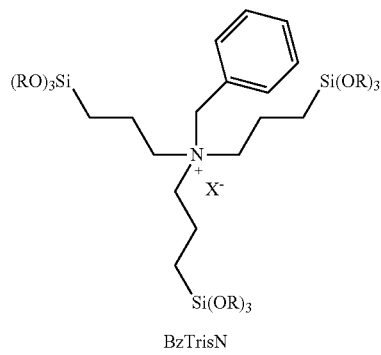

BzTrisN

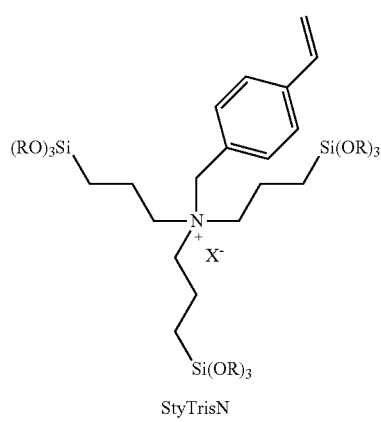

StyTrisN

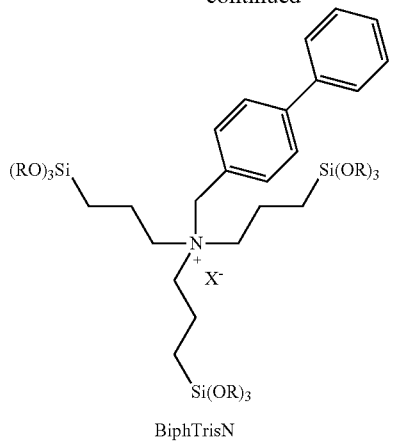

BiphTrisN in which R represents a methyl, ethyl or isopropyl group and more particularly a methyl group and $X^-$ represents a halide, it being possible for said compounds also to be called tris(3-(trialkoxysilyl)propyl)benzylammonium halide, tris (3-(trialkoxysilyl)propyl)(4-styrylmethyl)ammonium halide and tris(3-(trialkoxysilyl)propyl)(4-biphenyl)ammonium halide.

In particular, mention is made of tris(3-(trimethoxysilyl) propyl)benzylammonium (BzTrisN) halide and in particular the chloride, tris(3-(trimethoxysilyl)propyl)-(4-styrylmethyl)ammonium (StyTrisN) halide and in particular the chloride and tris(3-(trimethoxysilyl)propyl)(4-biphenyl)ammonium (BiphTrisN) halide and in particular the chloride.

According to another specific embodiment, a precursor may be represented by the following formula (II):

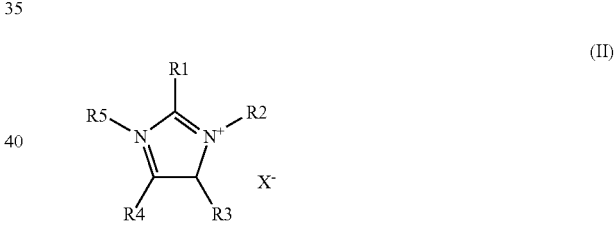

(II)

in which:

R1, R2, R3, R4 and R5 represent, independently of one another, a hydrogen atom or a $(C_1-C_{12})$alkyl group, for example a $(C_3-C_{11})$alkyl group, optionally substituted by a trialkoxysilyl group as defined above, at least two of the R1, R2, R3, R4 and R5 groups comprising a trialkoxysilyl group, and $X^-$ represents a halide.

Mention may in particular be made, as example of such a precursor of formula (II), of the compound of following formula:

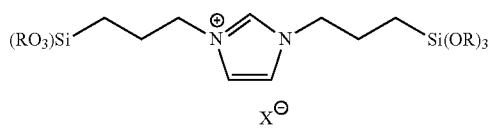

in which R represents a methyl, ethyl or isopropyl group and more particularly an ethyl group and $X^-$ represents a halide, it being possible for said compound also to be called 1,3-di(3-(trialkoxysilyl)propyl)-1H-imidazol-3-ium halide.

In particular, mention is made of 1,3-di(3-(triethoxysilyl)propyl)-1H-imidazol-3-ium halide and in particular the iodide.

According to another specific embodiment, a precursor may be represented by the following formula (III):

in which:

R1, R2, R3, R4, R5 and R6 represent, independently of one another, a hydrogen atom or a $(C_1-C_{12})$alkyl group, for example a $(C_3-C_{11})$alkyl group, optionally substituted by a trialkoxysilyl group as defined above, at least two of the R1, R2, R3, R4, R5 and R6 groups comprising a trialkoxysilyl group, and X⁻ represents a halide.

Mention may in particular be made, as example of such a precursor of formula (III), of the compound of following formula:

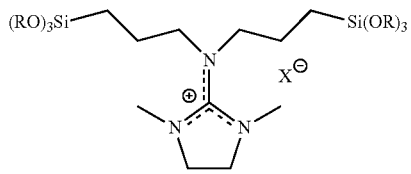

in which R represents a methyl, ethyl or isopropyl group and more particularly an ethyl group, it being possible for said compound also to be called N-(1,3-dimethylimidazolidin-2-ylidene)-N,N-[bis(3-(trialkoxysilyl)propyl]-1-aminium halide.

In particular, mention is made of N-(1,3-dimethylimidazolidin-2-ylidene)-N,N-[bis(3-(triethoxysilyl)propyl]-1-aminium halide and in particular the iodide.

According to another specific embodiment, a precursor may be represented by the following formula (IV):

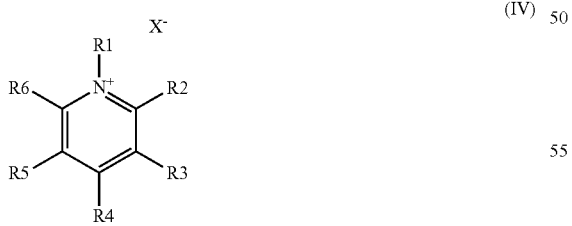

in which:

R1, R2, R3, R4, R5 and R6 represent, independently of one another, a hydrogen atom or a $(C_1-C_{12})$alkyl group, for example a $(C_3-C_{11})$alkyl group, optionally substituted by a trialkoxysilyl group as defined above, at least two of the R1, R2, R3, R4, R5 and R6 groups comprising a trialkoxysilyl group, and X⁻ represents a halide.

Mention may in particular be made, as example of such a precursor of formula (IV), of the compound of following formula:

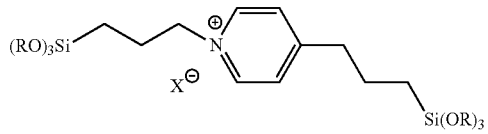

in which R represents a methyl, ethyl or isopropyl group and more particularly an ethyl group, it being possible for said compound also to be called 1,4-(3-(trialkoxysilyl)propyl)pyridinium halide.

In particular, mention is made of 1,4-(3-(triethoxysilyl)propyl)pyridinium halide and in particular the iodide.

According to another specific embodiment, a precursor may be represented by the following formula (V):

in which:

R1, R2, R3 and R4 represent, independently of one another, a hydrogen atom or a $(C_1-C_{12})$alkyl group, for example a $(C_3-C_{11})$alkyl group, optionally substituted by a trialkoxysilyl group as defined above, at least two of the R1, R2, R3 and R4 groups comprising a trialkoxysilyl group, and X⁻ represents a halide.

Mention may in particular be made, as example of such a precursor of formula (V), of the compound of following formula:

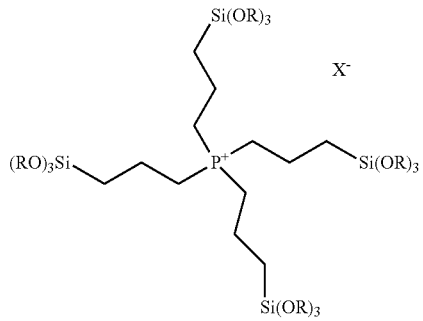

in which R represents a methyl, ethyl or isopropyl group and more particularly a methyl group and X⁻ represents a halide, it being possible for said compound also to be called tetrakis(3-(trialkoxysilyl)propyl)phosphonium halide.

In particular, mention is made of tetrakis(3-(trimethoxysilyl)propyl)phosphonium (TetraP) halide.

Mention may in particular be made, among the precursors which may more particularly be used in the context of the present invention, of tris(3-(trimethoxysilyl)propyl)ammonium (HTrisN) iodide, tris(3-(trimethoxysilyl)propyl)methylammonium (MeTrisN) iodide and tetrakis(3-(trimethoxysilyl)propyl)ammonium (TetraN) iodide.

According to one of its aspects, the present invention extends to the organosilicon material prepared by a hydrolysis/condensation process starting from the precursors of formula (I) defined above in which R1, R2, R3 and R4 represent, independently of one another, a hydrogen atom, a benzyl group, a 4-phenylbenzyl group, a styrene group or a ($C_1$-$C_{12}$)alkyl group, for example a ($C_3$-$C_{11}$)alkyl group, said alkyl group optionally being substituted by a trialkoxysilyl group as defined above, at least two of the R1, R2, R3 and R4 groups comprising a trialkoxysilyl group and one of the R1, R2, R3 and R4 groups being a benzyl group, a 4-phenylbenzyl group or a styrene group, $X^-$ represents a halide.

More particularly, the present invention extends to the organosilicon material prepared by hydrolysis/condensation starting from one of the following three precursors:

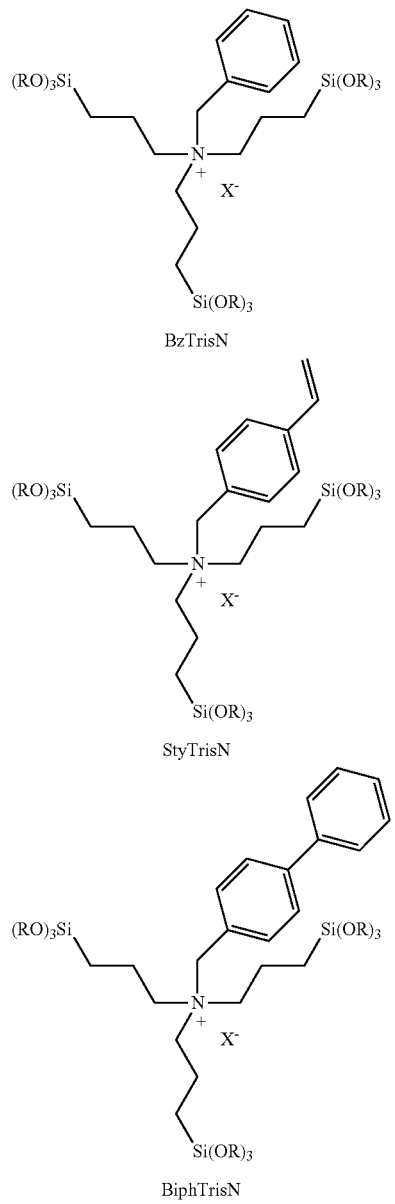

in which R represents a methyl, ethyl or isopropyl group and $X^-$ represents a halide.

In particular, mention is made of tris(3-(trimethoxysilyl)propyl)benzylammonium (BzTrisN) chloride, tris(3-(trimethoxysilyl)propyl)(4-styrylmethyl)ammonium (StyTrisN) chloride and tris(3-(trimethoxysilyl)propyl)(4-biphenyl)ammonium (BiphTrisN) chloride, the organosilicon materials resulting therefrom coming within the invention.

Pores

According to a specific embodiment, the material which may be employed in accordance with the invention comprises pores within it.

It could thus be observed that the presence of pores within the material results generally in an improvement in the sorption properties (accessibility and kinetic properties in particular).

According to a first alternative form of this specific embodiment, the material comprising such pores may exhibit an unorganized structure.

According to a second alternative form of this embodiment, the material comprising such pores may exhibit an organized structure, in particular a periodically organized structure. FIG. 10 diagrammatically illustrates this alternative form of the invention, namely a structured, for example nanostructured, porous, for example mesoporous, ionosilica material.

Both these two alternative forms cover microporous, mesoporous and macroporous materials.

The pores can be variable in shape. The shape can be spherical, cylindrical, parallel, slit pores or bottle pores in particular.

Within the meaning of the present invention and according to the IUPAC classification, "macroporous" material is understood to mean a material exhibiting a mean pore size of greater than 50 nm.

"Mesoporous" material is understood to mean a material exhibiting a mean pore size of between 2 and 50 nm.

"Microporous" material is understood to mean a material exhibiting a mean pore size of less than 2 nm.

Within the meaning of the present invention, "mean size" of the pores is understood to mean the size defined by a median pore diameter D50 resulting from the BJH pore size distribution, described below, by the adsorption or desorption branch.

This value may be measured according to the method described below.

Method Used

The pore size distribution is evaluated by the BJH method (Barrett, Joyner and Halenda, *Journal of the American Chemical Society*, 1951, 73, 373-380), which consists in analyzing, step by step, the nitrogen desorption isotherms at 77 K and in considering that, at each step, the amount of gas desorbed originates from cylindrical pores in which a capillary condensation of the nitrogen has taken place. The radius of these pores is obtained by use of the Kelvin equation. The assumptions are that the pores are cylindrical and open at the two ends, the wetting is perfect (the cosine of the contact angle equal to 1) and the condensate is in the liquid state.

In order to evaluate the organization of the porous network and, in the case of a structured network, to measure the center-to-center interpore distance for the materials prepared in the context of the present invention, use may be made of a diffractometer, in particular as sold by Philips under the name X'Pert Pro II.

The materials are used in the form of powders, either in a sealed capillary or on a rotating plate. The diffractograms are recorded over a range from 0.7 to 6° in 2θ (Kα line of Cu) so as to target the region of the mesopores.

According to a specific embodiment of the invention, the organosilicon material in accordance with the invention may comprise pores with a mean size of between 5 Å and 5 µm.

Thus, according to a first alternative form, the organosilicon material in accordance with the invention may comprise pores with a mean size of between 5 Å and 2 nm.

According to a second alternative form, the organosilicon material in accordance with the invention may comprise pores with a mean size of between 2 and 50 nm.

According to a third alternative form, the organosilicon material in accordance with the invention may comprise pores with a mean size of between 50 nm and 5 µm.

According to a specific embodiment of the invention, the organosilicon material in accordance with the invention comprises pores with a size of between 1 and 15 nm and more particularly between 1.5 and 8 nm.

The inventors have found that the adsorption properties, by virtue of these pores and of these pore sizes, prove to be particularly advantageous. In particular, the adsorption capacity reaches high values and the adsorption kinetics are also highly advantageous.

The pore size distribution can also influence the adsorption capacity and the anion-exchange kinetics.

All these types of distributions come within the invention, whether it is a monodisperse or polydisperse distribution, and whatever the diameter of the pores (micro-, meso- and macroporous) and whatever the shape of the pores, or the more or less structured organization of the porous network.

However, the inventors have been able to find that the adsorption capacity values may be particularly high when the pore size distribution tends toward a monodisperse distribution.

Within the meaning of the present invention, the quality of a homogeneous or monodisperse distribution is defined by its uniformity ratio (or index). It is calculated from the median values, which are determined from the cumulative pore size distribution (expressed in volume or in surface area). The 15% median is the value of the pore diameter for which 15% of the cumulative pore volume exhibits a size which is less than this diameter. The 85% median is the value of the pore diameter for which 85% of the cumulative pore volume exhibits a size which is less than this diameter. The uniformity ratio is given by the ratio of the 85% median to the 15% median. A "homogeneous" or monodisperse pore size distribution is understood to mean a distribution in which the uniformity ratio is less than 1.5.

In other words, the implementation of the present invention is particularly advantageous in terms of adsorption performance qualities when the material exhibits a "uniform" porosity, that is to say a porosity exhibiting pores which have substantially the same size. This means that, according to this specific embodiment, the size of the pores is preferably monodisperse or else that the size of the pores does not vary by more than 20% with respect to this monodispersity criterion, preferably not more than 15% and more preferably still not more than 10%.

The pore volume may typically be between 0 and 3 $cm^3/g$. In particular, the pore volume may advantageously be between 0.001 and 3 $cm^3/g$, more particularly between 0.002 and 3 $cm^3/g$, for example between 0.002 and 2.5 $cm^3/g$.

According to a preferred embodiment, when the material is prepared with a structuring agent (template) and contains pores, the pore volume may advantageously be between 0.3 and 3 $cm^3/g$, for example between 0.4 and 2.5 $cm^3/g$.

In this case, as in the case of the synthesis of conventional mesoporous silicas, template molecules are used at the time of the implementation of the hydrolysis/condensation process. Use is typically made, in the context of the present invention, as such template molecules, of surface-active agents. According to the nature of the surface-active agents, highly varied pore sizes may be targeted. It is thus possible to result in the different categories of materials mentioned above, namely mesoporous, macroporous or microporous materials.

According to this embodiment, the process may consist in carrying out the polymerization of the precursor(s) in the presence of a surfactant. The silicate network is then formed by hydrolysis and subsequent polycondensation of the silicon precursor(s) according to the sol-gel process, around self-assembled surfactant micelles, which act as templates.

Within the meaning of the present invention, "template molecule" is understood to mean the surfactant or the combination of molecules of surfactants arranged together, which, once removed from the material, gives rise to the pores.

Thus, the template molecules are subsequently removed, by extraction, according to methods well known to a person skilled in the art, to result in the desired ionosilica material.

The organosilicon materials in accordance with the invention may thus in particular be synthesized according to the method described in S. El Hankari et al., "Pore size control and organocatalytic properties of nanostructured silica hybrid materials containing amino and ammonium groups", *J. Mater. Chem.*, 2011, 21, 6948-6955.

The synthesis is based on the use of at least one precursor as described above by placing in aqueous solution, said aqueous solution comprising the surfactant, in particular arranged in the form of micelles, as template molecule.

The surfactant or template molecule may be dissolved in water, optionally in the presence of a buffer, at a temperature which may range from 15° C. to 50° C., for example from 20° C. to 45° C., with stirring. This dissolution phase may be carried out for a period of time which may range from 10 minutes to 12 hours, in particular from 30 minutes to 6 hours.

The precursor(s) may be introduced rapidly with vigorous stirring into an aqueous solution. The mixture obtained may be vigorously stirred at a temperature which may range from 20° C. to 95° C., for example from 30° C. to 90° C., for a period of time which may range from 30 minutes to 12 hours. The solution obtained may subsequently be heated, under static conditions, at a temperature of between 45° C. and 95° C., in particular between 50° C. and 90° C., at a pH value which may be between 1 and 14, in particular between 1 and 12.

The pH may be adjusted by a buffer or a strong acid or a strong base, for example chosen from buffers of the type of phosphates, carbonates, HEPES, TRIS, HCl, $CH_3COOH$, NaOH, KOH and $NH_4OH$.

The aqueous solution may in addition comprise an alcohol, in particular ethanol, methanol or isopropanol.

The product obtained after heating may be recovered by filtration and dried in the air, for example at a temperature ranging from 60° C. to 100° C., in particular from 80° C. to 90° C., for a period of time ranging from 6 to 24 hours, especially from 12 to 18 hours.

On conclusion of this stage, particles in the powder form are obtained.

It may also be advantageous to convert the powder thus obtained by one or more additional stages in order to obtain beads or monoliths in particular.

Mention may thus be made, as additional stage, of the shaping during the synthesis, the pelletizing and the sintering.

According to a preferred embodiment of the invention, an additional stage targeted at obtaining monoliths is favored. This embodiment exhibits the advantage of promoting the preservation of the properties desired for the material, such as expanded upon below, such as the adsorption capacity, the kinetic performance and the hydrophilicity.

The spatial arrangement of the micelles is dependent on the nature of the surfactants.

The spatial arrangement of the micelles is also dependent on the concentration of surfactants in the starting solution. For this reason, the final structure of the material, and in particular the shape of the pores, is also dependent on the concentration of anionic surfactants present in the starting solution.

Mention may be made, as examples of structures which may result from the process as described above, of lamellar, 2D-hexagonal or cubic structures.

The structuring may vary according to any physicochemical factor, such as the acidity, the temperature or also the duration of stirring.

Surfactants/Template Molecules

Within the meaning of the present invention, "surfactant" is understood to mean an amphiphilic molecule, that is to say that it exhibits two parts of different polarities, one lipophilic (which retains fatty substances) and nonpolar, and the other hydrophilic (miscible in water) and polar.

Mention may be made, among the surfactants which may be used in the context of the present invention, of anionic, cationic or nonionic surfactants:
- mention may be made, among anionic surfactants, of surfactants having carboxylate, sulfate, sulfonate and phosphate heads,
- mention may be made, among cationic surfactants, of surfactants having ammonium, imidazolium, guanidinium and pyridinium heads,
- mention may be made, among nonionic surfactants, of block (diblock, triblock, and the like) copolymers, sometimes known as poloxamers for the triblocks, and, for example, such as under the Pluronics or Synperonics or Brij names, sold by Sigma-Aldrich, BASF and Merck, and
- their mixtures.

According to a specific embodiment of the invention, use is made of anionic surfactants, in particular chosen from surfactants having carboxylate, sulfate, sulfonate and phosphate heads.

Thus, the inventors have found that the use of such anionic surfactants in comparison with surfactants of other natures brings about an enhancement in terms of adsorption capacities. Without wishing to be committed by any theory, the hypothesis is put forward that the anionic nature of the template molecules creates a type of "guide" in the orientation and the structuring of the positive charges at the surface of the pores of the material, facilitating the subsequent interaction with the negatively charged entities, the removal of which is targeted.

Mention may in particular be made, among anionic surfactants, of surfactants having sulfate heads, such as SDS (Sodium Dodecyl Sulfate) or SHS (Sodium Hexadecyl Sulfate).

Mention may also be made of surfactants having cationic heads, in particular ammonium heads, such as CTAB (Cetyl-TrimethylAmmonium Bromide), DTAB (DodecylTrimethylAmmonium Bromide) and TTAB (TetradecylTrimethylAmmonium Bromide).

Mention may also be made of neutral surfactants, such as triblock copolymers based on PEO (also known as poly (ethylene oxide)) and PPO (also known as poly(propylene oxide)) groups, for example sold under the Pluronics names by BASF (such as, for example, P103 ($EO_{17}PO_{56}EO_{17}$), P84 (($EO)_{19}(PO)_{43}(EO)_{19}$), P65 (($EO)_{19}(PO)_{29}(EO)_{19}$), P123 ($EO_{20}PO_{70}EO_{20}$) and F127 ($EO_{100}PO_{65}EO_{100}$).

The content of surfactant or template molecule which may be present in the aqueous solution prior to the introduction of the precursor may vary from 0.1% to 10%, in particular from 0.5% to 5%, especially from 1% to 3%, by weight, with respect to the total weight of the aqueous solution.

The size of the pores may be adjusted using any technique well known to a person skilled in the art.

Swelling Agent

According to a specific embodiment, it is possible to add swelling agents to the starting solution, prior to the polymerization reaction. The presence of such agents makes it possible to increase the size of the pores.

Mention may in particular be made, as swelling agents, of mesitylene, toluene, xylene, trimethylbenzene, triethylbenzene or triisopropylbenzene.

The content of swelling agent which may be present in the aqueous solution prior to the introduction of the precursor may vary from 0.1% to 50%, in particular from 0.2% to 40%, especially from 0.5% to 30%, by weight, with respect to the total weight of the aqueous solution.

Use

According to one aspect of the invention, the organosilicon or ionosilica materials in accordance with the invention may be used as anion or radionuclide exchanger.

More particularly, they may have a utility in the treatment of water, the treatment of industrial effluents, in the retention of contaminants of the type of metals, polyoxoanions, and/or organic molecular entities chosen from dyes and medicinal active principles.

They may also be useful in the treatment of effluents resulting from nuclear applications and in the retention of contaminants of radionuclide type. In other words, they may be particularly advantageous in nuclear applications.

Mention may in particular be made, among the contaminants which may more particularly be mentioned as being able to be adsorbed by the material in accordance with the invention, of:
(i) radionuclides chosen from the different forms of the following elements I, Se, Mo, Tc, Cr, Sb, and the like,
(ii) mineral anions chosen from chromate, arsenate, thiocyanate, nitrate, chloride, iodide, bromide, perchlorate and the like ions,
(iii) anionic molecular entities, such as pesticides, for example chosen from dichlorophenoxyacetic acid, sulfometuron, and the like,
(iv) negatively charged dyes chosen from cochineal reds, methyl orange, orange II, orange G, acid blue 45, acid blue 25, carminic acid, alizarin yellow R. and the like,
(v) negatively charged active principles chosen from para-aminosalicylate, diclofenac, penicillin G, nateglinide, ibuprofen, indomethacin, di-anionic carbenicillin, and the like.

Thus, according to one of its aspects, the invention relates to the use of an organosilicon material for removing radionuclides, in particular as described in detail above, from an aqueous solution, characterized in that the structure of said organosilicon material is formed of repeat units, each repeat unit comprising at least one positively charged entity and being incorporated in a silicon network by at least two silicon-carbon bonds.

Thus, according to another of its aspects, the invention relates to the use of an organosilicon material for removing mineral anions, anionic molecular entities and negatively charged dyes or active principles, in particular as described in detail above, from an aqueous solution, characterized in that the structure of said organosilicon material is formed of repeat units, each repeat unit resulting from a precursor comprising at least one positively charged entity and being incorporated in a silicon network by at least two silicon-carbon bonds.

The number of silicon-carbon bonds may be two, three or four.

As will become apparent in more detail in the examples which follow, the inventors have shown that materials in accordance with the invention exhibit improved adsorption capacities with regard to conventional materials of poly(styrene)/poly(divinylbenzene) anion-exchange resin type. More particularly, a retention capacity was measured which reaches up to 2.5 mmol/g, to be compared with approximately 1.0-1.5 mmol/g for these conventional exchangers.

Thus, the ionosilicas under accordance with the present invention may exhibit an adsorption capacity of between 0.5 and 4 mmol/g, in particular between 1 and 3.5 mmol/g. The performance qualities of the materials are retained when the ionosilicas are used in the powder form or after shaping, in particular shaping in the form of beads or monoliths, as set out above. The retention of these performance qualities is illustrated in particular in example 6.

The organosilicon materials in accordance with the invention may in particular be employed in aqueous solution at the entire range of concentrations which may be envisaged for the contaminant to be removed, namely from weakly concentrated to highly concentrated, in other words not solely in the form of traces.

The adsorption capacity may be measured according to the method described in detail below.

Method for Measuring the Adsorption Capacity

It is measured by the batch method. A solution including the solute concerned by the adsorption is brought into contact with a known weight of an adsorbent solid. The adsorption of the solute is reflected by simultaneous variations in its concentration in solution and in its concentration at the surface of the solid. The latter are determined experimentally (UV, Elemental analysis, Chromatography, Polarography, ICP-MS, and the like). Explicitly, either a solution of volume V (L) containing a solute i at the initial concentration $C_i$ (mol/l) brought into contact with a weight $w_s$ (kg) of adsorbent solid. At a given instant t, if the concentration of the supernatant solution is $C_{eq}$ (mol/l), then the amount of solid which has changed from the liquid phase toward the solid is given by the difference V $(C_i-C_{eq})$ (mol).

If this disappearance is due to the adsorption, the amount adsorbed per unit of weight of adsorbent at the instant t is then:

$$Q_{ads}=(C_i-C_{eq})*V/m_s$$

The volume of solution may vary from 0.5 to 500 ml, in particular from 1 to 200 ml, especially from 5 to 50 ml. The weight of solid may vary from 1 mg to 50 g, in particular from 1 mg to 10 g, especially from 1 mg to 10 g. The initial concentration may vary from 0.001 millimol/l to 5 mol/l, in particular from 0.01 millimol/l to 2 mol/l, especially from 0.05 millimol/l to 1 mol/l.

Although the organosilicon or ionosilica materials in accordance with the invention which do not exhibit pores show an advantageous adsorption capacity in themselves, this adsorption capacity is increased when pores are present in the material.

In reality, the maximum sorption capacities are related to the amount of exchanger groups, that is to say of the precursors initially incorporated in the material, and the accessibility of these exchanger groups is also determining with regard to the adsorption capacity, which is why the presence of pores within the material increases the adsorption capacity. For example, more than ⅔ (between 61% and 83%) of the precursors are accessible in the materials synthesized in example 2.

As regards the sorption kinetics, it is advantageously possible to measure the percentage of adsorption capacity reached respectively in 1 minute, 2 minutes, 5 minutes, 10 minutes, 15 minutes, 20 minutes, 40 minutes, 1 hour, 80 minutes, 120 minutes, 180 minutes, 240 minutes and 1200 minutes.

The adsorption kinetics may prove in particular to be rapid in the alternative form of the invention in which the material comprises pores. This means that as a result of the good accessibility of the exchanger groups and of the high affinity, the adsorption performance qualities may be advantageously maintained/guaranteed, even for relatively short contact times with the effluents.

It is considered, for example, that the kinetics are rapid when the materials have reached 90% of their maximum capacity in less than 2 hours, in particular 80% in less than 1 hour.

Without wishing to be committed by any theory, the inventors have hypothesized that these improved performance qualities originate from the different make up of the materials or ionosilicas in accordance with the invention, which are composed of ionic entities, incorporated in a silicon network by covalent bonds. This difference is also the cause of a possible higher chemical stability. In the materials in accordance with the invention, the exchanger ionic entities are thus bonded to the matrix of the material by at least two chemical bonds.

Furthermore, with respect to materials of surface-functionalized silica type, which exhibit moderate hydrophilicities, the ionosilicas in accordance with the invention exhibit an enhanced hydrophilic nature. Furthermore, this property exhibits in particular the advantage of promoting faster kinetics than for conventional ion-exchange resins, as is illustrated in the examples.

Thus, the hydrophilicity may be measured by adsorption of butanol in water. This measurement may be carried out on a liquid flow calorimeter. The thermal effect given off during the competitive adsorption of butanol in heptane, on the solid brought into contact beforehand with the solvent heptane, is measured. The hydrophilic surface is evaluated with respect to the amount of heat thus measured (and by comparison with a reference solid). For the hydrophobic surface, it is determined according to the same approach, by competitive adsorption of butanol in water on the solid brought into contact beforehand with water.

The inventors have compared the values for adsorption capacity available in the literature relating to materials obtained by cocondensation, in comparison with the measurements obtained for materials in accordance with the invention. For the record, these materials of the prior art exhibit surface modifications and not bulk modifications, as in the context of the present invention. These comparison tests bring to light the order of magnitude of the gain in the adsorption capacity values, although the chemical structures are not properly speaking truly comparable as a result of this major difference in the location of the exchanger groups, as mentioned above.

On a sample of mesoporous silica of AMS type prepared by cocondensation of TEOS in the presence of APTES (A. E. Garcia-Bennett, O. Terasaki, S. Che and T. Tatsumi, Chemistry of Materials, 2004, 16, 813-821), the maximum $CrO_4^{2-}$ capacity obtained is 0.2 mmol/g.

It emerges from the above that the materials in accordance with the invention exhibit adsorption capacities which are highly advantageous and far superior to the adsorption capacities which may be obtained with materials known to a person skilled in the art and obtained by cocondensation.

According to a specific embodiment of the invention, the treatment of water may be carried out on a column, using infusing bags or also using membranes or films comprising the material in accordance with the invention, in static form, or in dynamic form with continuous circulation in treatment columns.

Throughout the description, including the claims, the expression "comprising a" should be understood as being synonymous with "comprising at least one", unless otherwise specified.

The expressions "between . . . and . . . ", "of between . . . and . . . " and "ranging from . . . to . . . " should be understood as limits included, unless otherwise specified.

The examples which follow are presented by way of illustration and without limitation of the invention.

EXAMPLES

Example 1: Preparation of Nonporous Ionosilica Materials

Water (0.16 ml) is added to a solution of the precursor TetraN (1.59 g) in methanol (6.7 ml) at ambient temperature. The solution is then well stirred until a homogeneous mixture is formed. The catalyst tetrabutylammonium fluoride (TBAF) is subsequently added and the solution is vigorously stirred for 1 min. A transparent gel is then formed after 15 min. The gel obtained is left at ambient temperature for 2 days.

Finally, the gel formed is filtered off, washed with $Et_2O$ and then dried under vacuum at 150° C. for 6 hours.

An organosilicon material in accordance with the invention is obtained. The specific surface is 33 m²/g and the $N_2$ adsorption-desorption isotherm as represented in FIG. 1 shows that the material does not exhibit porosity.

Example 2: Preparation of Porous Ionosilica Materials

The following 9 ionosilicas were prepared according to the following table 1:

TABLE 1

| Template | Precursor | | |
|---|---|---|---|
| | TrisN | MeTrisN | TetraN |
| SHS | Ionosilica 1 | Ionosilica 2 | Ionosilica 3 |
| CTAB | Ionosilica 4 | Ionosilica 5 | Ionosilica 6 |
| P123 | Ionosilica 7 | Ionosilica 8 | Ionosilica 9 |

Ionosilica 1 (TrisN/SHS)

The surfactant sodium hexadecyl sulfate SHS (226 mg) is dissolved in 17.9 ml of water and 2 ml of 1M hydrochloric acid. This solution is stirred at 60° C. for 1 h. A solution of the precursor TrisN (0.5 g) in 2 ml of ethanol is subsequently added to this solution. The reaction medium is stirred at 60° C. for 2 h and then left under static conditions at 80° C. for 72 h. After this time, the solution is cooled to ambient temperature. The material is isolated by filtration and dried at atmospheric pressure at 80° C. for 18 h. Finally, the template is removed by repeated washing (3 times) in a 200 ml of ethanol/5 ml of concentrated hydrochloric acid solution.

Ionosilica 2 (MeTrisN/SHS)

The surfactant sodium hexadecyl sulfate SHS (386 mg) is dissolved in 37.0 ml of water and 2.2 ml of 1M hydrochloric acid. This solution is stirred at 60° C. for 1 h. A solution of the precursor MeTrisN (0.7 g) in 2 ml of ethanol is subsequently added to this solution. The reaction medium is stirred at 60° C. for 2 h and then left under static conditions at 80° C. for 72 h. After this time, the solution is cooled to ambient temperature. The material is isolated by filtration and dried at atmospheric pressure at 80° C. for 18 h. Finally, the template is removed by repeated washing (3 times) in a 200 ml of ethanol/5 ml of concentrated hydrochloric acid solution.

Ionosilica 3 (TetraN/SHS)

The surfactant sodium hexadecyl sulfate SHS (386 mg) is dissolved in 37.0 ml of water and 2.2 ml of 1M hydrochloric acid. This solution is stirred at 60° C. for 1 h. A solution of the precursor TetraN (1.0 g) in 1 ml of ethanol is subsequently added to this solution. The reaction medium is stirred at 60° C. for 2 h and then left under static conditions at 80° C. for 72 h. After this time, the solution is cooled to ambient temperature. The material is isolated by filtration and dried at atmospheric pressure at 80° C. for 18 h. Finally, the template is removed by repeated washing (3 times) in a 200 ml of ethanol/5 ml of concentrated hydrochloric acid solution.

Ionosilica 4 (TrisN/CTAB)

The surfactant cetyltrimethylammonium bromide CTAB (362 mg) is dissolved in 23.7 ml of water and 0.5 ml of aqueous ammonia (25 wt. %). This solution is stirred at ambient temperature for 1 h. A solution of the precursor TrisN (1 g) in 2 ml of ethanol is subsequently added to this solution. The reaction medium is stirred at ambient temperature for 2 h and then left under static conditions at 80° C. for 72 h. After this time, the solution is cooled to ambient temperature. The material is isolated by filtration and dried at atmospheric pressure at 80° C. for 18 h. Finally, the template is removed by repeated washing (3 times) in a 200 ml of ethanol/5 ml of concentrated hydrochloric acid solution.

Ionosilica 5 (MeTrisN/CTAB)

The surfactant cetyltrimethylammonium bromide CTAB (362 mg) is dissolved in 23.7 ml of water and 0.5 ml of aqueous ammonia (25 wt. %). This solution is stirred at ambient temperature for 1 h. A solution of the precursor MeTrisN (1.1 g) dissolved in 2 ml of ethanol is subsequently added to this solution. The reaction medium is stirred at ambient temperature for 2 h and then left under static conditions at 80° C. for 72 h. After this time, the solution is cooled to ambient temperature. The material is isolated by filtration and dried at atmospheric pressure at 80° C. for 18 h. Finally, the template is removed by repeated washing (3 times) in a 200 ml of ethanol/5 ml of concentrated hydrochloric acid solution.

Ionosilica 6 (TetraN/CTAB)

The surfactant cetyltrimethylammonium bromide CTAB (362 mg) is dissolved in 23.7 ml of water and 0.5 ml of aqueous ammonia (25 wt. %). This solution is stirred at ambient temperature for 1 h. A solution of the precursor TetraN (1.5 g) dissolved in 2 ml of ethanol is subsequently added to this solution. The reaction medium is stirred at ambient temperature for 2 h and then left under static conditions at 80° C. for 72 h. After this time, the solution is cooled to ambient temperature. The material is isolated by filtration and dried at atmospheric pressure at 80° C. for 18 h. Finally, the template is removed by repeated washing (3 times) in a 200 ml of ethanol/5 ml of concentrated hydrochloric acid solution.

Ionosilica 7 (TrisN/P123)

A solution of the surfactant P123 in a water/hydrochloric acid mixture is prepared beforehand from the following amounts: 105 ml of water; 24.1 g of concentrated hydrochloric acid; 4.35 g of P123. This solution is stirred at 40° C. for 3 h. 0.8 g of the precursor TrisN, dissolved in 1 ml of ethanol, is added at 40° C. to 4.61 g of this solution. The reaction medium is stirred at 40° C. for 2 h and then left under static conditions at 80° C. for 72 h. After this time, the solution is cooled to ambient temperature. The material is isolated by filtration and dried at atmospheric pressure at 80° C. for 18 h. Finally, the template is removed by repeated washing (3 times) in a 200 ml of ethanol/5 ml of concentrated hydrochloric acid solution.

Ionosilica 8 (MeTrisN/P123)

A solution of the surfactant P123 in a water/hydrochloric acid mixture is prepared beforehand from the following amounts: 105 ml of water; 24.1 g of concentrated hydrochloric acid; 4.35 g of P123. This solution is stirred at 40° C. for 3 h.

0.9 g of the precursor MeTrisN, dissolved in 1 ml of ethanol, is added at 40° C. to 4.61 g of this solution. The reaction medium is stirred at 40° C. for 2 h and then left under static conditions at 80° C. for 72 h. After this time, the solution is cooled to ambient temperature. The material is isolated by filtration and dried at atmospheric pressure at 80° C. for 18 h. Finally, the template is removed by repeated washing (3 times) in a 200 ml of ethanol/5 ml of concentrated hydrochloric acid solution.

Ionosilica 9 (TetraN/P123)

A solution of the surfactant P123 in a water/hydrochloric acid mixture is prepared beforehand from the following amounts: 105 ml of water; 24.1 g of concentrated hydrochloric acid; 4.35 g of P123. This solution is stirred at 40° C. for 3 h.

1.3 g of the precursor MeTrisN, dissolved in 1 ml of ethanol, is added at 40° C. to 4.61 g of this solution. The reaction medium is stirred at 40° C. for 2 h and then left under static conditions at 80° C. for 72 h. After this time, the solution is cooled to ambient temperature. The material is isolated by filtration and dried at atmospheric pressure at 80° C. for 18 h. Finally, the template is removed by repeated washing (3 times) in a 200 ml of ethanol/5 ml of concentrated hydrochloric acid solution.

Characterization

The materials were characterized by $N_2$ adsorption-desorption at 77K, X-ray diffraction, $^{13}C$ NMR, $^{29}Si$ NMR, IR, Scanning Electron Microscopy and Transmission Electron Microscopy. The specific surfaces of the porous materials extend from 211 to 1019 $m^2/g$. The combined results are given in the table below. The pore volumes extend from 0.403 to 1.684 $cm^3/g$. The combined results are given in table 2 below. The other characterization methods have confirmed the textural, structural and physicochemical properties.

TABLE 2

Figure 1:
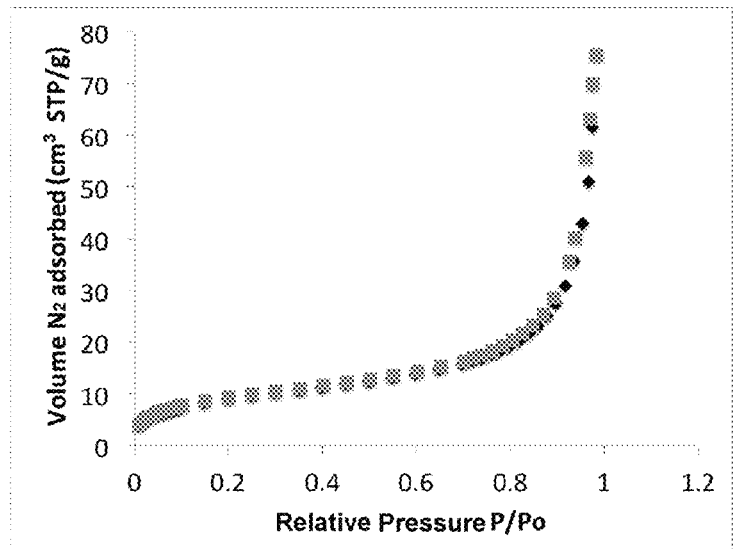
Figure 2:
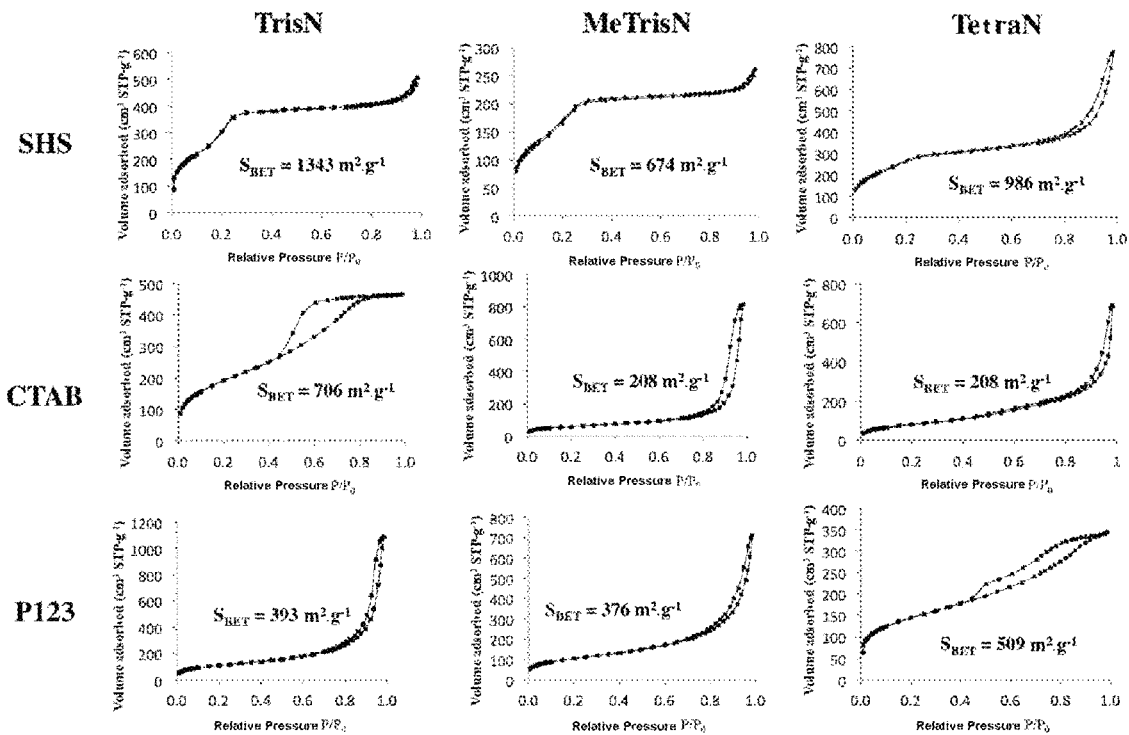
FIG. 2 illustrates the corresponding isothermal curves for $N_2$ adsorption-desorption at 77K.
Figure 3:
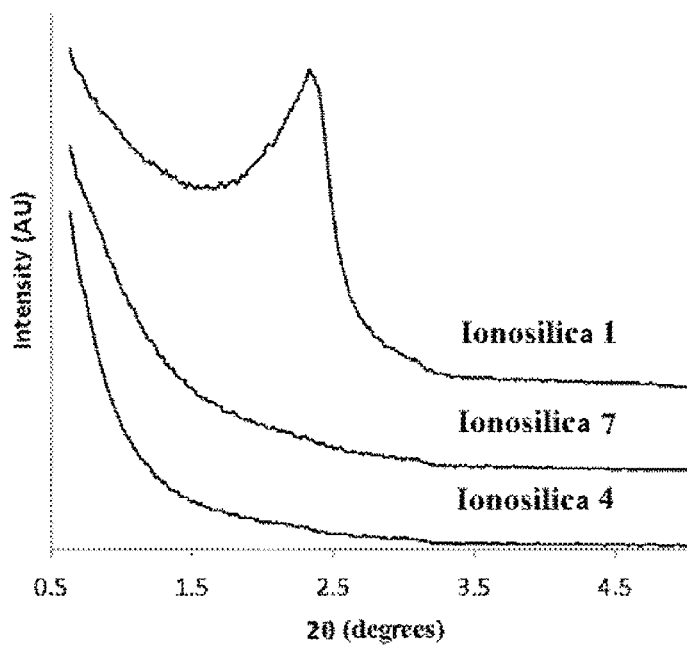
FIG. 3 illustrates the X-ray diffraction curves corresponding to the samples prepared from the precursor TrisN.
Figure 4:
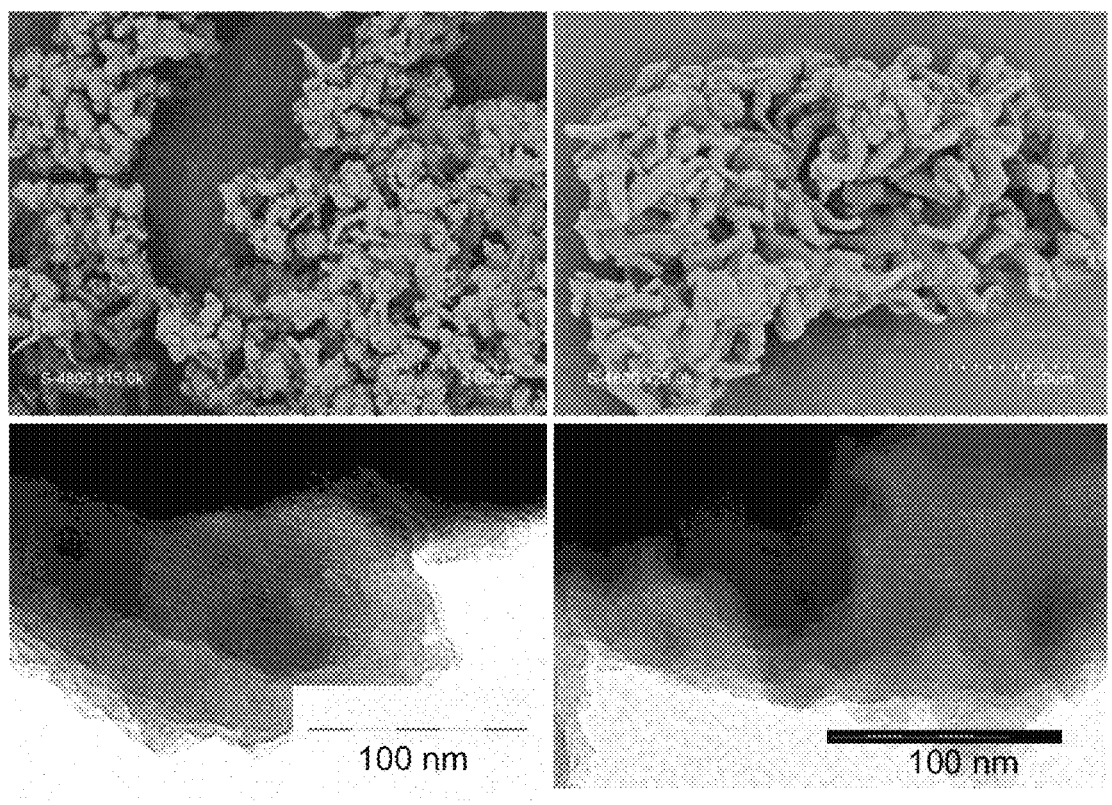
FIG. 4 represents the SEM and TEM images of the materials 1 and 2.

| Template/Precursor | | $S_{BET}$ ($m^2 \cdot g^{-1}$) | Pore volume ($cm^3 \cdot g^{-1}$) |
|---|---|---|---|
| SHS/TrisN | Ionosilica 1 | 1019 | 0.526 |
| SHS/MeTrisN | Ionosilica 2 | 656 | 0.403 |
| SHS/TetraN | Ionosilica 3 | 978 | 1.198 |
| CTAB/TrisN | Ionosilica 4 | 708 | 0.722 |
| CTAB/MeTrisN | Ionosilica 5 | 211 | 1.259 |
| CTAB/TetraN | Ionosilica 6 | 298 | 1.065 |
| P123/TrisN | Ionosilica 7 | 396 | 1.684 |
| P123/MeTrisN | Ionosilica 8 | 378 | 1.104 |
| P123/TetraN | Ionosilica 9 | 514 | 0.533 |

Example 3: Adsorption of Chromate Ions and Comparison Test with Ion-Exchange Resins Protocol The ionosilicas as prepared in example 2 were compared with commercial adsorbents of exchange resin type. These are, for example, Amberlite resins (IRA96 and IRA67 for Industrial Grade Weak Base Anion Exchanger and IRN 78 for Nuclear Grade Strong Base Anion Resin).

These resins were tested under the same experimental conditions as our materials by following a single experimental protocol. The protocol is based on a batch procedure, for which the concentration at equilibrium of the supernatant solution makes it possible, by virtue of the method of residues, to evaluate the amount adsorbed per gram of material.

A mother solution with a 3 mM concentration of $CrO_4^{2-}$ is prepared. A weight of $w_s$ 10 mg of ionosilica is placed in a round-bottomed tube. One volume of ultrapure water is subsequently added to this tube (by weighing). One volume of mother solution is subsequently added to this same tube (by weighing). The total volume V is 20 ml and the proportions of water and of mother solution are established so as to have points distributed over the whole of the curve and in order to cover an initial concentration range from 0.03 mM to 3 mM. The tubes are placed on an agitator (10-15 revolutions/minute) in a chamber thermostatically controlled at 25° C. After agitating for 14 hours, the pH of each suspension is measured (calibration of the electrode with the 4-7-10 buffer solutions). The supernatant is subsequently separated from the solid by centrifuging at 10 000 rpm for 15 minutes and then filtered (0.45 μm syringe filter). The concentration at equilibrium of each solution is measured (by ion chromatography or by UV-visible spectroscopy). The calibration curve with 4 to 6 standard solutions (between 0.06 and 0.6 mM, prepared from the same mother solution) is plotted (a new curve for each new isotherm). The excessively concentrated points are diluted by 10 (by weighing) in order to be compatible with the concentration range of the calibration curve. It is then possible, from the calculation of the initial concentration ($C_i$) and from the measurement of the concentration at equilibrium ($C_{eq}$), to calculate the amount of $CrO_4^{2-}$ sorbed per gram of ionosilica, from the formula: $Q_{ads}=(C_i-C_{eq})*V/m_s$.

For the measurements on the resins, the weight of solid $w_s$ is 50 mg, the volume V is 20 ml. The concentration of the mother solution is 5 mM, for an initial concentration range from 0.05 mM to 5 mM. The solid is separated from the solution by simple filtration on a 0.45 µm syringe filter. The calibration curve is established for the concentrations between 0.03 and 0.5 mM.

Results

1. Retention Capacities

The maximum capacity measurements are collated in table 3 below:

TABLE 3

| Template/Precursor | | Amount of $CrO_4^{2-}$ retained by the ionosilica material (in mmol/g) |
|---|---|---|
| SHS/TrisN | Ionosilica 1 | 2.5 |
| SHS/MeTrisN | Ionosilica 2 | 2.4 |
| SHS/TetraN | Ionosilica 3 | 1.7 |
| CTAB/TrisN | Ionosilica 4 | 2.4 |
| CTAB/MeTrisN | Ionosilica 5 | 2.0 |
| CTAB/TetraN | Ionosilica 6 | 1.6 |
| P123/TrisN | Ionosilica 7 | 2.0 |
| P123/MeTrisN | Ionosilica 8 | 2.4 |
| P123/TetraN | Ionosilica 9 | 2.0 |

By way of reference, the material prepared without a structuring agent exhibits a sorption capacity of 1.6 mmol/g.

Figure 5:
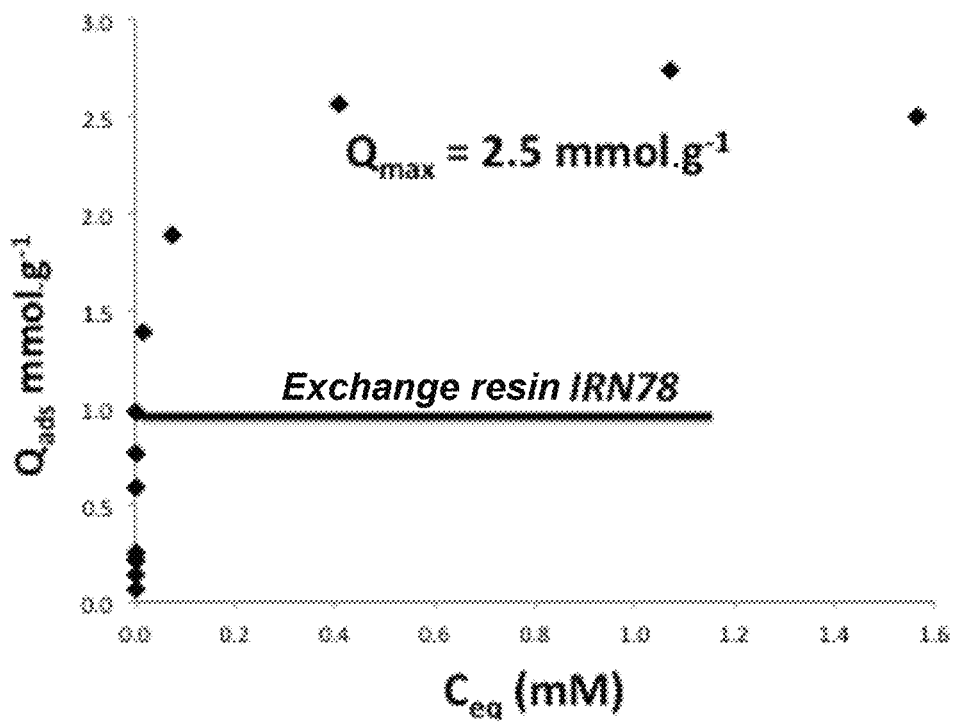

By way of example, FIG. 5 represents the sorption isotherm curve of the ionosilica material 1. The look of the sorption isotherm curve shows a very high affinity from the very low concentrations of entity to be retained in the solution. It is noted that the shape of the this curve, virtually vertical at the very low concentrations, clearly shows the effectiveness of these materials in accordance with the invention.

The ion-exchange resins used by way of comparison have shown maximum capacities of 0.1, 0.05 and 1 mmol/g for IRA96, IRA67 and IRN 78 respectively, for measurements carried out at free pH.

The capacities for retention of the chromate ions for the materials in accordance with the invention are in a range from 1.6 to 2.5 mmol of product retained per unit of weight [g] of dry adsorbant. This result is especially advantageous if it is compared with those obtained for conventional exchange resins, in this instance IRN78 sold by Rohm and Haas.

2. Exchange Kinetics

Figure 6:
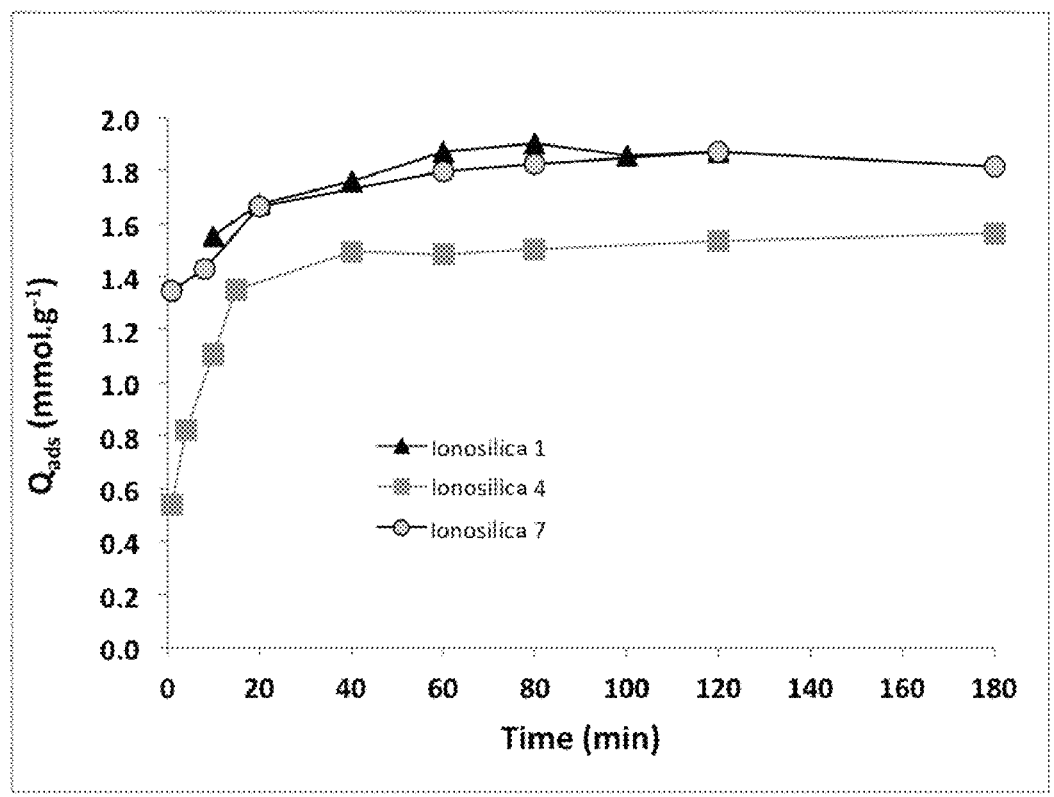

Furthermore, FIG. 6 illustrates the sorption/retention kinetics of chromate anions with regard to the three ionosilicas 1, 4 and 7 as prepared in example 2, with the following conditions; the weight of solid is $w_{solid}$: 10 mg and the volume in the solution is 20 ml in all cases. The initial concentration is $C_i$=1.5 mmol·l$^{-1}$ for ionosilica 1 (TrisN/SHS) and $C_i$=1 mmol·l$^{-1}$ for ionosilica 4 (TrisN/CTAB) and ionosilica 7 (TrisN/P123). The solids are left in contact with the material for increasing periods of time, extending from 1 minute to 20 hours. As soon as the desired contact time is reached, the supernatant is subsequently separated from the solid and the concentration at equilibrium of each solution is measured (by ion chromatography or by UV-visible spectroscopy)

This sorption kinetics a very rapid. FIG. 6 shows that, after scarcely 5 minutes, between 55% and 83% of the maximum capacity is reached. After 20 minutes of contact, 90% of the chromate initially present is entirely retained, and the sorption is total after less than one hour.

3. Hydrophilic Nature

The hydrophilic nature of the materials tested has been demonstrated.

The hydrophilic/hydrophobic nature of the ionosilicas as prepared in example 2 in terms of hydrophilic/hydrophobic surface was measured by adsorption calorimetry for butanol in water or in heptane respectively (M. J. Meziani, J. Zajac, D. J. Jones, J. Roziere and S. Partyka, "Surface Characterization of Mesoporous Silicoaluminates of the MCM-41 Type: Evaluation of Polar Surface Sites Using Flow calorimetry, Adsorption of a Cationic Surfactant as a Function of Pore Size and Aluminum Content", Langmuir, 1997, 13, 5409-5417, and Szczodrowski K., Prelot B., Lantenois S., Douillard J-M. and Zajac J., "Effect of heteroatom doping on the surface acidity and hydrophilicity of Al, Ti, Zr-doped mesoporous SBA-15 obtained by repeated synthesis", Microporous and Mesoporous Materials, 2009, 124 (1-3), 84-93).

The following results were obtained, collated in the following table 4:

TABLE 4

| | TrisN | MeTrisN | TetraN |
|---|---|---|---|
| | Hydrophobic nature (mJ/m$^2$) | | |
| SHS | 8 | 1 | 5 |
| CTAB | 2 | 3 | 2 |
| | Hydrophilic nature (mJ/m$^2$) | | |
| SHS | 454 | 338 | 297 |
| CTAB | 374 | 624 | 611 |

These materials are particularly hydrophilic in comparison with other structured and/or functionalized materials. Mention may be made, as example, of a nonporous hydrophilic silica (XOB015) or of Al-doped porous silicas, for which the values obtained are respectively 79 and 55 mJ/m$^2$.

The good properties of hydrophilicity are favorable to good wettability of the material, to good accessibility of the exchanger sites. This makes possible an increased diffusion and increased sorption rates, for better performance qualities, in particular in terms of exchange kinetics, as a result of the very high affinity of the material for the effluent.

Example 4: Adsorption Capacities with Regard to Organic Anions 4.1 Adsorption Capacities with Regard to Para-Aminosalicylate para-Aminosalicylate may be regarded as a model molecule for anionic active principles.

Protocol

A similar protocol to that of example 2 was followed for the sorption measurements of para-aminosalicylate. In this case, the weight of solid $w_s$ is 5 mg, the volume V is 20 ml. The concentration of the mother solution is 1 mM, for an initial concentration range from 0.01 mM to 1 mM. The solid is separated from the solution by centrifugation and then filtration on a 0.45 µm syringe filter. The concentration of para-aminosalicylate is evaluated by UV-VIS spectroscopy, at $\lambda_{max}$=265 nm. The calibration curve is established for the concentrations between 0.01 and 0.1 mM.

Results

Figure 7:
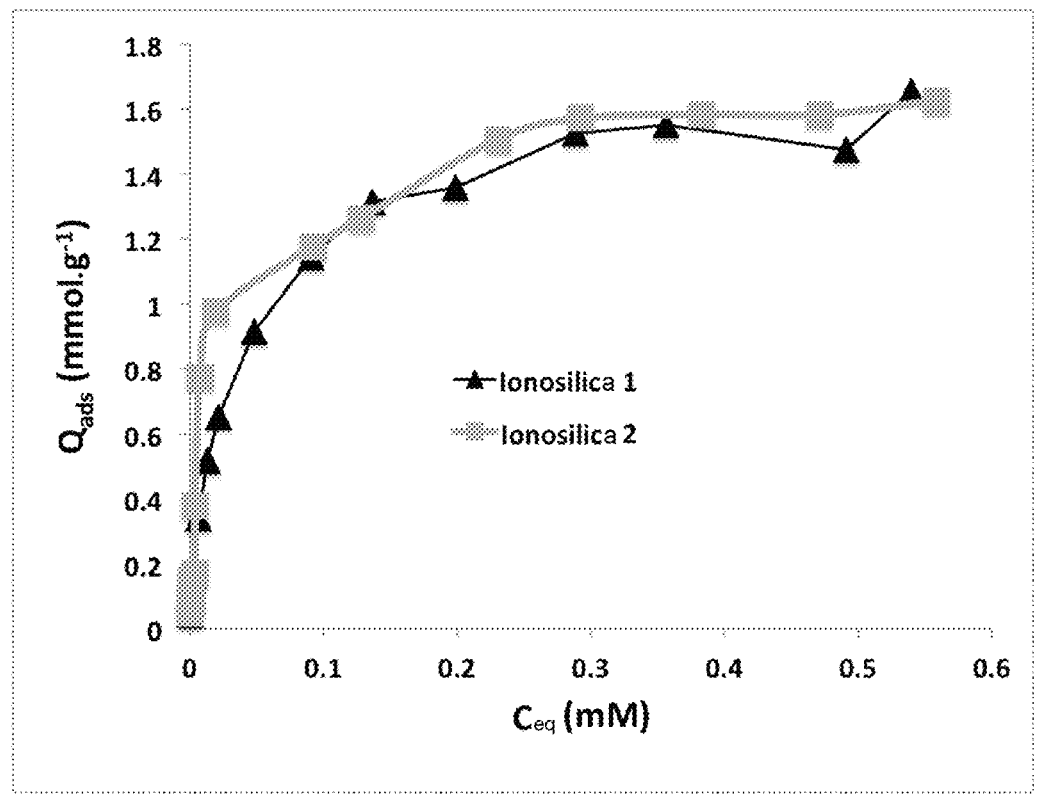

The adsorption capacity is 1.6 mmol/g for the ionosilicas 1 and 2 (see FIG. 7).

4.2 Adsorption Capacities with Regard to Methyl Orange

Methyl orange may be regarded as a model molecule for anionic dyes.

A similar protocol to that of example 2 was followed for the sorption measurements of methyl orange. In this case, the weight of solid $w_s$ is 2.5 mg, the volume V is 20 ml. The concentration of the mother solution is 2 mM, for an initial concentration range from 0.02 mM to 2 mM. The solid is separated from the solution by centrifugation and then filtration on a 0.45 µm syringe filter. The concentration of methyl orange is evaluated by UV-VIS spectroscopy, at $\lambda_{max}$=266 nm. The calibration curve is established for the concentrations between 0.01 and 0.08 mM.

Results

Figure 8:
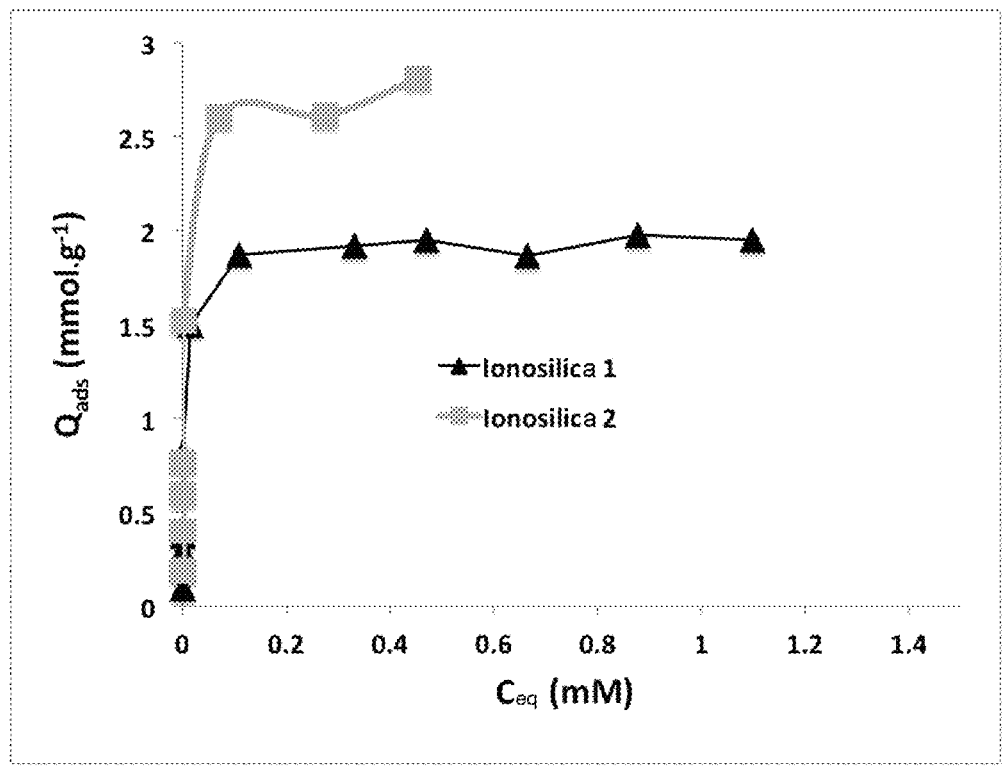
Figure 9:
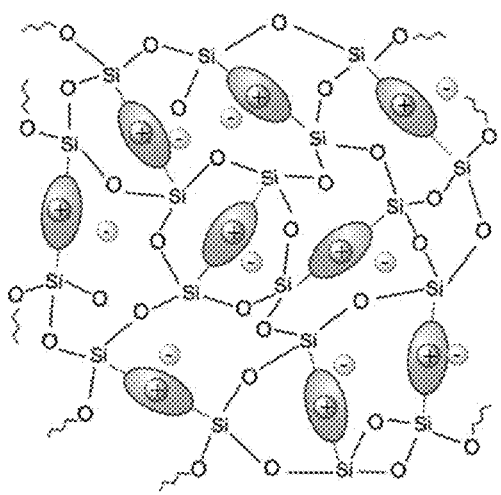
Figure 10:
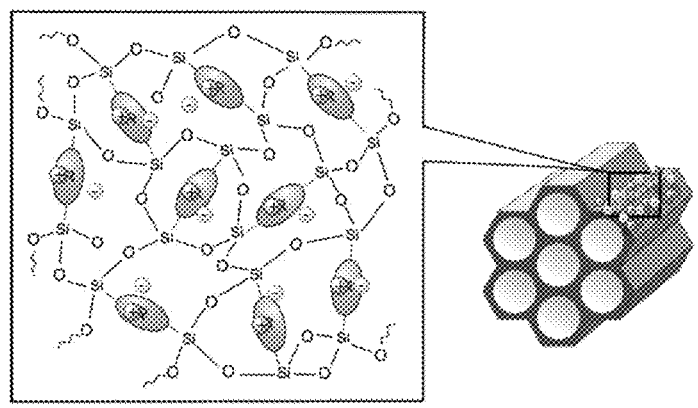
Figure 11:
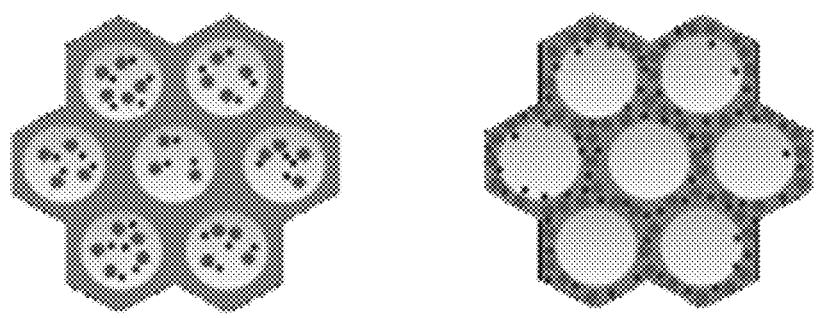

The adsorption capacity is 2 and 2.5 mmol/g for the ionosilicas 1 and 2 (see FIG. 8).

Example 5: Preparation of Porous Ionosilica Materials Based on a Precursor Containing a Benzyl Group Benzyltris(3-(trimethoxysily)propyl)ammonium (BzTrisN) chloride Benzyl chloride (1.26 g, 10 mmol) is added, at ambient temperature and under argon, to a solution of tris(3-(trimethoxysily)propyl)amine (5.03 g, 10 mmol) dissolved in 10 ml of acetonitrile. The reaction medium was heated at 80° C. for 48 h. After this time, the reaction medium was cooled to ambient temperature and the solvent was removed under vacuum. The crude product was purified by repeated washing with pentane and finally isolated by drying under vacuum at 50° C.

The precursors (4-vinylbenzyl)tris(3-(trimethoxysily)propyl)ammonium (StyTrisN) chloride and (4-biphenylmethyl)tris(3-(trimethoxysilyl)propyl)ammonium (BiphTrisN) chloride were synthesized by similar protocols starting from 5.04 g of TrisN and 3.05 g of 4-vinylbenzyl chloride (StyTrisN) or 2.52 g of TrisN and 1.24 g of 4-(chloromethyl) biphenyl.

The formation of the precursors was demonstrated by high-resolution mass spectroscopy.

Synthesis of the Materials 173 mg of sodium hexadecyl sulfate and 44 mg of potassium chloride were dissolved in a mixture of 11.6 ml of water and 0.2 ml of hydrochloric acid (1M). This solution was stirred at 60° C. for 30 min. Subsequently, a solution of 0.6 mmol (378 mmg) of the precursor BzTrisN dissolved in 1 ml of 95% ethanol was rapidly added to this first solution. The reaction medium was stirred at 60° C. for 20 min and was kept under static conditions at 70° C. for 72 h. After this time, the precipitate formed was isolated by filtration and drying at 70° C. for 24 h. Finally, the surfactant was removed by repeated washing with a solution of 100 ml of 95% ethanol and 5 ml of hydrochloric acid (37%). The solid obtained was isolated by filtration and dried at 70° C. for 24 h.

The materials resulting from the precursors StyTrisN and BiphTrisN were synthesized by similar protocols starting from 394 mg of StyTrisN or from 450 mg of BiphTrisN respectively.

Characterization

The materials were characterized by $N_2$ adsorption-desorption, X-ray diffraction, Scanning Electron Microscopy and Transmission Electron Microscopy. $^{13}C$ NMR, $^{29}Si$ NMR. The specific surfaces of the porous materials extend from 20 to 956 $m^2/g$. The combined results are given in table 5 below. The other characterization methods have confirmed the textural, structural and physicochemical properties.

Figure 12:
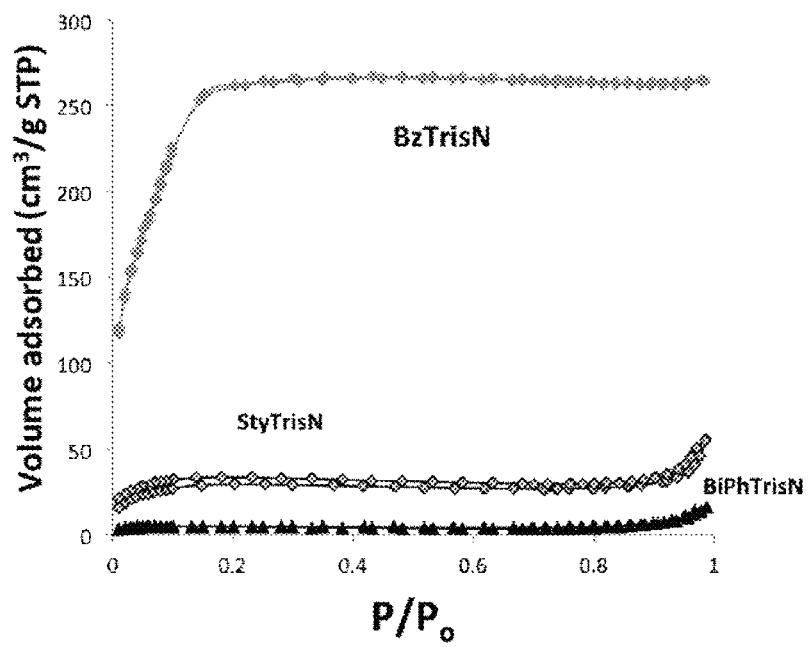

FIG. 12 illustrates the corresponding isothermal curves for $N_2$ adsorption-desorption at 77K.

Figure 13:
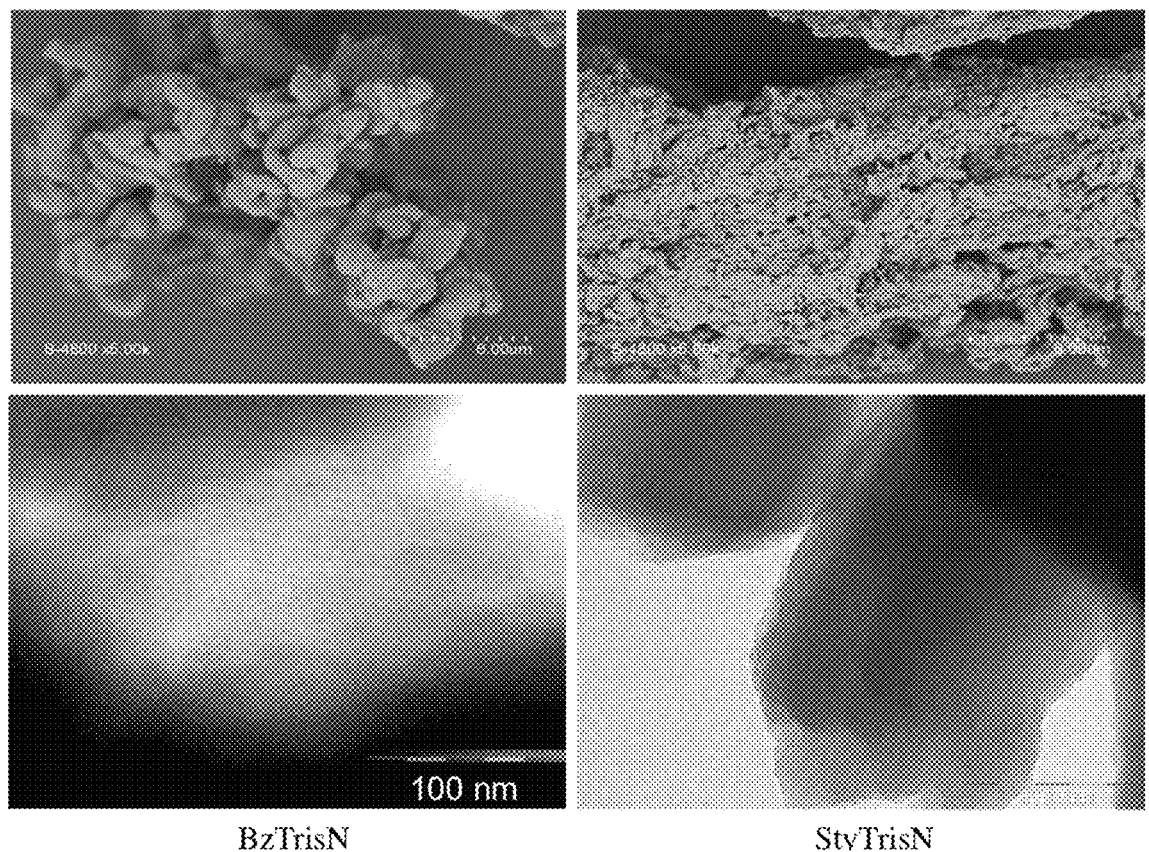

FIG. 13 represents the SEM and TEM images of the materials SHS/StyTrisN and SHS/BzTrisN.

TABLE 5

| Template/Precursor | $S_{BET}$ ($m^2 \cdot g^{-1}$) | Pore volume ($cm^3 \cdot g^{-1}$) |
|---|---|---|
| SHS/BzTrisN | 956 | 0.397 |
| SHS/StyTrisN | 114 | 0.032 |
| SHS/BiPhTrisN | 20 | 0.002 |

Example 6: Shaping of the Ionosilicon Materials 6.1. Synthesis of Monolith and Extraction by the Supercritical $CO_2$ Method:

In a first step, a monolith in the solvent phase is synthesized. For this, 1 g of TrisN (1.98 mmol) is dissolved in 6 ml of ethanol (96%). The solution is stirred for 5 minutes. 0.02 ml of a 1M solution of TBAF in THF is added to this mixture. The mixture is stirred for 15 minutes. The sol-gel obtained is subsequently poured into two closed polypropylene tubes and left at ambient temperature for 1 day. The solvent-based monolith obtained is removed from the mold in order to be immersed in an acidified ethanol solution (50 ml of ethanol with 2.5 ml of a 37% HCl solution) for 1 day. Subsequently, the monolith is dried by supercritical $CO_2$ using an appropriate cell. The process consists in removing the ethanol present in our monolith using liquid and then supercritical $CO_2$ without modifying the molecular structure thereof.

A conventional cycle is adopted which comprises three phases. A first phase which consists in extracting the (excess) ethanol from the cell by liquid $CO_2$. During this phase, the pressure is gradually increased from 1 bar to 63.5 bar (2 bar·$min^{-1}$) and then the pressure is left unchanged for 1 hour at 20° C. The second phase, for its part, consists in replacing the liquid $CO_2$ with supercritical $CO_2$. For this, the pressure is increased up to 100 bar and the temperature is increased from 20° C. to 40° C. (1° C.·$min^{-1}$). Once these conditions are achieved, the cell containing the monolith is left under supercritical $CO_2$ for two hours. To finish, the third phase consists in depressurizing the cell. This phase is carried out by decreasing the pressure from 100 bar to 1 bar with a gradient of 1 bar·$min^{-1}$ while keeping the temperature constant at 40° C. Subsequently, the temperature is decreased down to ambient temperature.

Figure 14:
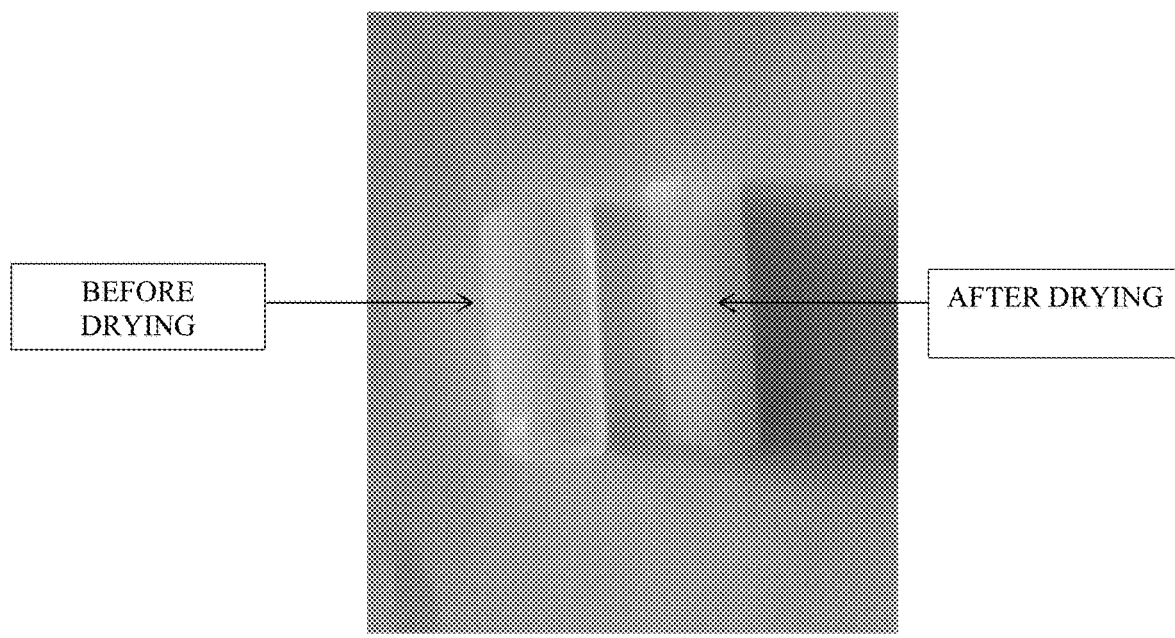
Figure 15:
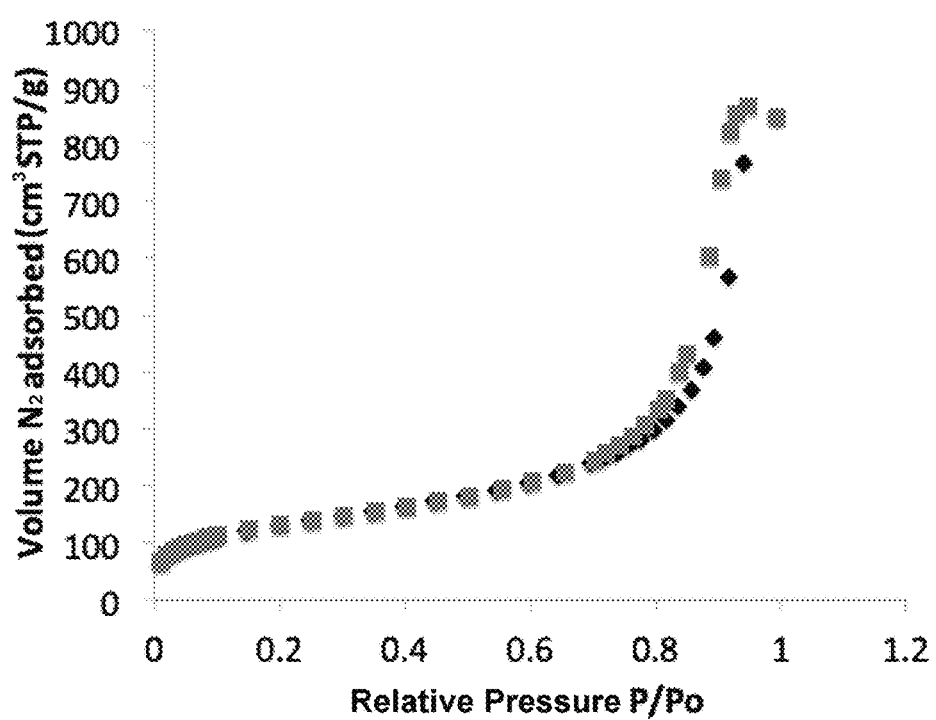

A 2 cm×0.8 cm cylindrical monolith is obtained with a weight of 0.255 g. A photograph of the monolith is presented in FIG. 14. The material exhibits a specific surface of 470 $m^2 \cdot g^{-1}$ and a pore volume of 1.20 $cm^3 \cdot g^{-1}$ (see FIG. 15). Its maximum adsorption capacity for chromates (according to the procedure described above) is 2.5 mmol·$g^{-1}$.

6.2. Synthesis of Pellets by Flash Sintering

The organosilica 1 as prepared in example 1 was shaped by flash sintering. The material in the powder form is introduced into a specific chamber with a diameter of 8 mm. It is subsequently sintered with a gradient of 50° C./min, from ambient temperature up to 250° C. under nitrogen. The pellets thus obtained exhibit thicknesses between 2 mm and 4 mm.

Figure 16:
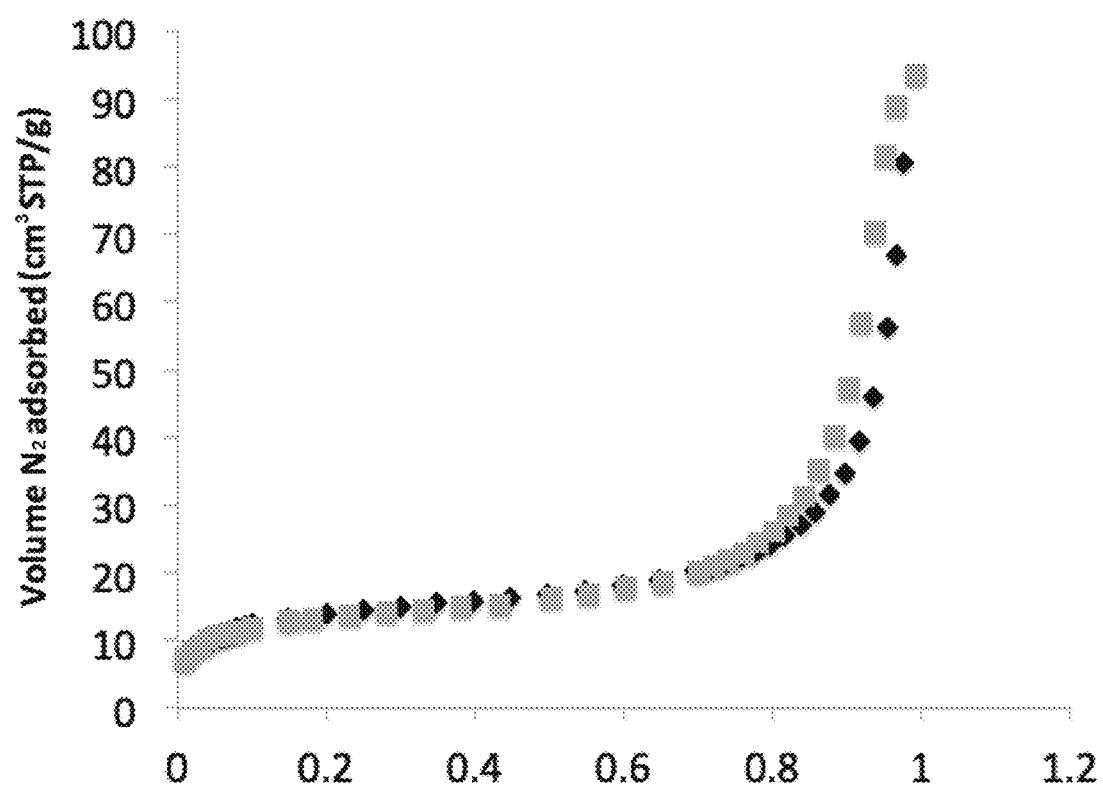

The material exhibits a specific surface of 47 m²·g⁻¹ and a pore volume of 0.13 cm³·g⁻¹ (see FIG. 16). Its maximum adsorption capacity for chromates (according to the procedure described above in the section "Method for measuring the adsorption capacity" in the description) is 1.8 mmol·g⁻¹.

The invention claimed is:

1. A method of removing from an aqueous solution radionuclides, mineral anions, anionic molecular entities, negatively charged dyes, and/or active principles, wherein the method comprises treating the aqueous solution with an organosilicon material formed of repeat units incorporated into a silicon network by silicon-carbon bonds,
wherein each repeat unit comprises at least one positively charged entity chosen from an ammonium entity, an imidazolium entity, a guanidinium entity, a pyridinium entity, or a phosphonium entity.

2. The method according to claim 1, wherein the repeat units result from precursors chosen from:
a precursor according to formula (I):

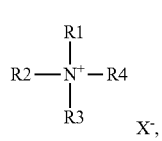

(I)

wherein: R1, R2, R3, and R4 are, independently of one another, a hydrogen atom, a benzyl group, a 4-phenylbenzyl group, a styrene group, or a $(C_1-C_{12})$alkyl group that is optionally substituted by a trialkoxysilyl group; at least two of the R1, R2, R3, and R4 groups comprise a trialkoxysilyl group; at most one of the R1, R2, R3, and R4 groups is benzyl group, a 4-phenylbenzyl group, or a styrene group; and X⁻ is a halide;
a precursor according to formula (II):

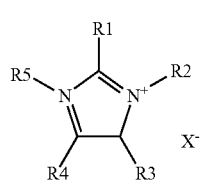

(II)

wherein: R1, R2, R3, R4, and R5 are, independently of one another, a hydrogen atom or a $(C_1-C_{12})$alkyl group optionally substituted by a trialkoxysilyl group; at least two of the R1, R2, R3, R4, and R5 groups comprise a trialkoxysilyl group; and X⁻ is a halide;
a precursor according to formula (III):

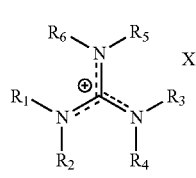

(III)

wherein: R1, R2, R3, R4, R5, and R6 are, independently of one another, a hydrogen atom or a $(C_1-C_{12})$alkyl group optionally substituted by a trialkoxysilyl group;
at least two of the R1, R2, R3, R4, R5, and R6 groups comprise a trialkoxysilyl group; and X⁻ is a halide;
a precursor according to formula (IV):

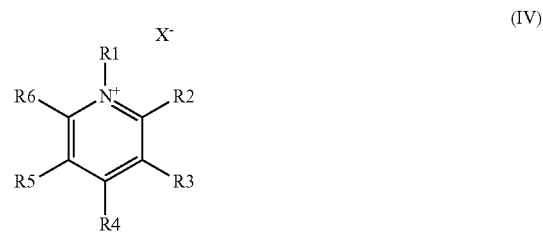

(IV)

wherein: R1, R2, R3, R4, R5, and R6 are, independently of one another, a hydrogen atom or a $(C_1-C_{12})$alkyl group optionally substituted by a trialkoxysilyl group; at least two of the R1, R2, R3, R4, R5, and R6 groups comprise a trialkoxysilyl group; and X⁻ is a halide;
a precursor represented by the following formula (V):

(V)

wherein: R1, R2, R3, and R4 are, independently of one another, a hydrogen atom or a $(C_1-C_{12})$alkyl group optionally substituted by a trialkoxysilyl group; at least two of the R1, R2, R3, and R4 groups comprise a trialkoxysilyl group; and X⁻ is a halide; or
mixtures thereof.

3. The method according to claim 2, wherein the precursors are chosen from:
tris(3-(trialkoxysilyl)propyl)methylammonium halide;
tris(3-(trialkoxysilyl)propyl)ammonium halide, and tetrakis(3-(trialkoxysilyl)propyl)ammonium halide;
tris(3-(trialkoxysilyl)propyl)benzylammonium halide, tris(3-(trialkoxysilyl)propyl)(4-styrylmethyl)ammonium halide and tris(3-(trialkoxysilyl)propyl)(4-biphenyl) ammonium halide;
1,3-di(3-(trialkoxysilyl)propyl)-1H-imidazol-3-ium halide;
N-(1,3-dimethylimidazolidin-2-ylidene)-N,N-[bis(3-(trialkoxysilyl)propyl]-1-aminium halide;
1,4-(3-(trialkoxysilyl)propyl)pyridinium halide;
tetrakis(3-(trialkoxysilyl)propyl)phosphonium halide; or
a mixture thereof.

4. The method according to claim 2, wherein the precursors are chosen from:
tris(3-(trimethoxysilyl)propyl)methylammonium halide;
tris(3-(trimethoxysilyl)propyl)ammonium halide and tetrakis(3-(trimethoxysilyl)propyl)ammonium halide;
tris(3-(trimethoxysilyl)propyl)benzylammonium halide, tris(3-(trimethoxysilyl)propyl)(4-styrylmethyl)ammonium halide and tris(3-(trimethoxysilyl)propyl)(4-biphenyl)ammonium halide;
N-(1,3-dimethylimidazolidin-2-ylidene)-N,N-[bis(3-(triethoxysilyl)propyl]-1-aminium halide;
1,4-(3-(triethoxysilyl)propyl)pyridinium halide;
tetrakis(3-(trimethoxysilyl)propyl)phosphonium halide; or
a mixture thereof.

5. The method according to claim 1, wherein the organosilicon material is provided in the form of particles, wherein the size of the particles is between 50 nm and 5 cm.

6. The method according to claim 1, wherein the organosilicon material is provided in the form of a powder, grains, beads, or monoliths.

7. The method according to claim 5, wherein the size of the particles is between 200 nm and 2 nm.

8. The method according to claim 1, wherein the organosilicon material is in the form of a powder with a size of between 50 nm and 50 µm or in the form of monoliths with a size of between 5 mm and 5 cm.

9. The method according to claim 1, wherein the adsorption capacity of the organosilicon material is greater than 0.5 mmol/g.

10. The method according to claim 1, wherein the adsorption capacity of the organosilicon material is between 0.5 and 4 mmol/g.

11. The method according to claim 1, wherein the organosilicon material comprises pores.

12. The method according to claim 11, wherein the pores are arranged in an organized fashion.

13. The method according to claim 11, wherein the pores are arranged according to a periodical organization.

14. The method according to claim 11, wherein the organosilicon material is prepared by using a hydrolysis/condensation process in the presence of an anionic, cationic, or nonionic surfactant.

15. The method according to claim 11, wherein the mean pore size, expressed as median pore diameter D50, is between 5 Å and 5 µm.

16. The method according to claim 11, wherein the material exhibits a pore volume of between 0.3 and 3 cm$^3$/g.

17. The method according to claim 1, wherein the adsorption kinetics of the organosilicon material are such that the material reaches 90% of its maximum adsorption capacity in less than 2 hours.

18. The method according to claim 1, wherein the aqueous solution is chosen from water or industrial effluents comprising contaminants.

19. The method according to claim 18, wherein the contaminants are chosen from metals, polyoxoanions, dyes, medicinal active principles, or mixtures thereof.

20. The method according to claim 18, wherein the contaminants are selected from:
(i) mineral anions chosen from chromate, arsenate, thiocyanate, nitrate, chloride, iodide, bromide, or perchlorate ions;
(ii) anionic molecular entities;
(iii) negatively charged dyes chosen from cochineal reds, methyl orange, orange II, orange G, acid blue 45, acid blue 25, carminic acid, or alizarine yellow R;
(iv) negatively charged active principles chosen from para-aminosalicylate, diclofenac, penicillin G, nateglinide, ibuprofen, indomethacin, or di-anionic carbenicillin; or
mixtures thereof.

21. The method according to claim 20, wherein the anionic molecular entities are pesticides chosen from dichlorophenoxyacetic acid or sulfometuron.

22. A method of removing radionuclide contaminants chosen from different forms of elements I, Se, Mo, Tc, Cr, Sb, or mixtures thereof, from an aqueous effluent resulting from nuclear applications, the method comprising treating the effluent with an organosilicon material formed of repeat units, wherein each repeat unit comprises at least one positively charged entity chosen from an ammonium entity, an imidazolium entity, a guanidinium entity, a pyridinium entity, or a phosphonium entity, and wherein each repeat unit is incorporated in a silicon network by at least two silicon-carbon bonds.

23. The method according to claim 1, wherein the method is carried out on a column, wherein the method comprises using infusing bags, membranes, and/or films with continuous circulation in treatment columns.

24. An organosilicon material prepared by hydrolysis/condensation starting from precursors of formula (I):

wherein:

R1, R2, R3, and R4 are, independently of one another, a hydrogen atom, a benzyl group, a 4-phenylbenzyl group, a styrene group, or a $(C_1-C_{12})$alkyl group optionally substituted by a trialkoxysilyl group;

at least two of the R1, R2, R3, and R4 groups comprise a trialkoxysilyl group;

one of the R1, R2, R3, and R4 groups is a benzyl group, a 4-phenylbenzyl group, or a styrene group; and X$^-$ is a halide.

25. The organosilicon material according to claim 24, prepared from one of the following three precursors:

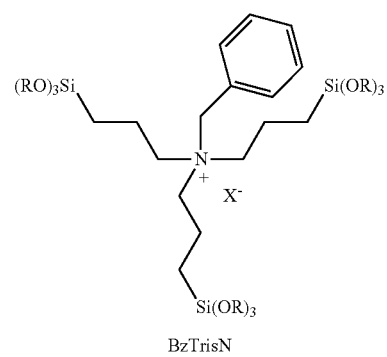
BzTrisN

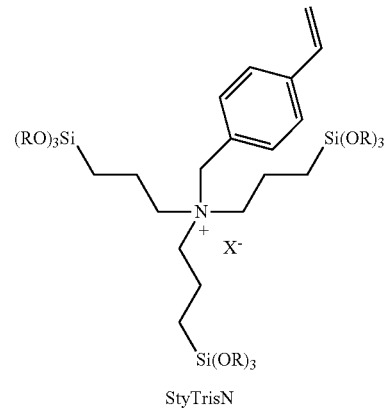
StyTrisN

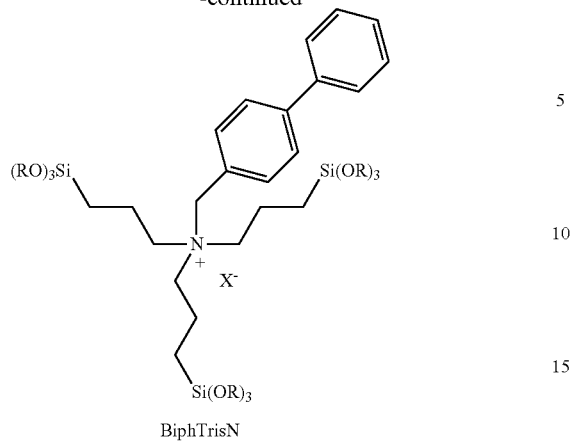
BiphTrisN
wherein R is a methyl, ethyl, or isopropyl group and X⁻ is a halide.
26. The organosilicon material according to claim 24, prepared from a precursor chosen from tris(3-(trimethoxysilyl)propyl)benzylammonium halide, tris(3-(trimethoxysilyl)propyl)(4-styrylmethyl)ammonium halide, or tris(3-(trimethoxysilyl)propyl)(4-biphenyl)ammonium halide.
* * * * *